US012650638B2

(12) United States Patent
Li et al.

(10) Patent No.: US 12,650,638 B2
(45) Date of Patent: Jun. 9, 2026

(54) LASER PROJECTION APPARATUS

(71) Applicant: HISENSE LASER DISPLAY CO., LTD., Shandong (CN)

(72) Inventors: Jianjun Li, Shandong (CN); Xintuan Tian, Shandong (CN); Wei Li, Shandong (CN); Youliang Tian, Shandong (CN); Xianrong Liu, Shandong (CN); Xiaoqiang Gu, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 290 days.

(21) Appl. No.: 18/595,241

(22) Filed: Mar. 4, 2024

(65) Prior Publication Data

US 2024/0248383 A1 Jul. 25, 2024

Related U.S. Application Data

(63) Continuation of application No. PCT/CN2022/117366, filed on Sep. 6, 2022.

(30) Foreign Application Priority Data

Sep. 6, 2021 (CN) .......................... 202111037630.2
Sep. 6, 2021 (CN) .......................... 202111038583.3
(Continued)

(51) Int. Cl.
*G03B 21/20* (2006.01)

(52) U.S. Cl.
CPC ....... *G03B 21/2033* (2013.01); *G03B 21/208* (2013.01)

(58) Field of Classification Search
None
See application file for complete search history.

(56) References Cited

U.S. PATENT DOCUMENTS

2013/0234177 A1 9/2013 Chiu et al.
2014/0226337 A1 8/2014 Timmers et al.
(Continued)

FOREIGN PATENT DOCUMENTS

CN 201093370 Y 7/2008
CN 201162993 Y 12/2008
(Continued)

OTHER PUBLICATIONS

International search report of PCT application No. PCT/CN2022/117366 issued on Nov. 28, 2022.
(Continued)

*Primary Examiner* — Bao-Luan Q Le
*Assistant Examiner* — Danell L Owens
(74) *Attorney, Agent, or Firm* — Knobbe, Martens, Olson & Bear, LLP

(57) ABSTRACT

Provided is a laser projection apparatus. The laser projection apparatus includes a light source assembly, a light-modulating assembly, and a projection lens. The light source assembly includes a base plate, a frame, a plurality of light-emitting chips, a metal ring structure, a metal cover plate, and a light-transmitting layer. The frame is disposed on the base plate, and an accommodating space is defined between the base plate and the frame, and a material of the frame is ceramic. The plurality of light-emitting chips are disposed in the accommodating space and configured to emit laser light. The metal ring structure is configured to be fixed to the frame. An outer edge of the metal cover plate is fixed to one side of the metal ring structure distal from the base plate. An edge of the light-transmitting layer is fixed to an inner edge of the metal cover plate.

20 Claims, 10 Drawing Sheets

(30) Foreign Application Priority Data

| | | |
|---|---|---|
| Sep. 7, 2021 | (CN) | .......................... 202111045935.8 |
| Dec. 31, 2021 | (CN) | .......................... 202111669286.9 |

(56) References Cited

U.S. PATENT DOCUMENTS

| | | | |
|---|---|---|---|
| 2016/0341395 A1 | 11/2016 | Kiyota et al. |
| 2018/0166849 A1 | 6/2018 | Egawa |
| 2021/0134766 A1 | 5/2021 | Suich et al. |
| 2023/0198219 A1 | 6/2023 | Li et al. |
| 2023/0335971 A1 | 10/2023 | Sugita et al. |

FOREIGN PATENT DOCUMENTS

| | | | | |
|---|---|---|---|---|
| CN | 101852388 | A | | 10/2010 |
| CN | 202676983 | U | | 1/2013 |
| CN | 103032856 | A | | 4/2013 |
| CN | 202915104 | U | | 5/2013 |
| CN | 103311233 | A | | 9/2013 |
| CN | 103594615 | A | | 2/2014 |
| CN | 106168333 | A | | 11/2016 |
| CN | 106199783 | A | | 12/2016 |
| CN | 108227358 | A | | 6/2018 |
| CN | 109975985 | A | | 7/2019 |
| CN | 209690673 | U | | 11/2019 |
| CN | 111562713 | A | | 8/2020 |
| CN | 211203868 | U | | 8/2020 |
| CN | 112038884 | A | * | 12/2020 |
| CN | 112103764 | A | | 12/2020 |
| CN | 112283598 | A | | 1/2021 |
| CN | 112305682 | A | | 2/2021 |
| CN | 112825406 | A | | 5/2021 |
| CN | 112825409 | A | | 5/2021 |
| CN | 112909729 | A | | 6/2021 |
| CN | 112909730 | A | | 6/2021 |
| CN | 112909731 | A | | 6/2021 |
| CN | 214069080 | U | | 8/2021 |
| CN | 113594847 | A | | 11/2021 |
| CN | 113703271 | A | | 11/2021 |
| CN | 113764972 | A | | 12/2021 |
| CN | 113872042 | A | | 12/2021 |
| CN | 216162112 | U | | 4/2022 |
| CN | 216929162 | U | | 7/2022 |
| JP | 2007059207 | A | | 3/2007 |
| JP | 2007316175 | A | | 12/2007 |
| JP | 2017201684 | A | | 11/2017 |
| WO | 2020134220 | A | | 7/2020 |
| WO | 2021117286 | A1 | | 6/2021 |

OTHER PUBLICATIONS

International search report of PCT application No. PCT/CN2022/117390 issued on Dec. 14, 2022.

International search report of PCT application No. PCT/CN2022/113950 issued on Nov. 1, 2022.

China National Intellectual Property Administration, First office action of Chinese application No. 202111037630.2 issued on Nov. 11, 2022, which is foreign counterpart application of this US application.

China National Intellectual Property Administration, Second office action of Chinese application No. 202111037630.2 issued on Mar. 17, 2023, which is foreign counterpart application of this US application.

China National Intellectual Property Administration, Notification to grant patent right for invention of Chinese application No. 202111037630.2 issued on Apr. 9, 2023, which is foreign counterpart application of this US application.

China National Intellectual Property Administration, First office action of Chinese application No. 202111038583.3 issued on Jun. 21, 2022, which is foreign counterpart application of this US application.

China National Intellectual Property Administration, Second office action of Chinese application No. 202111038583.3 issued on Jan. 12, 2023, which is foreign counterpart application of this US application.

China National Intellectual Property Administration, Notification to grant patent right for invention of Chinese application No. 202111038583.3 issued on May 26, 2023, which is foreign counterpart application of this US application.

* cited by examiner

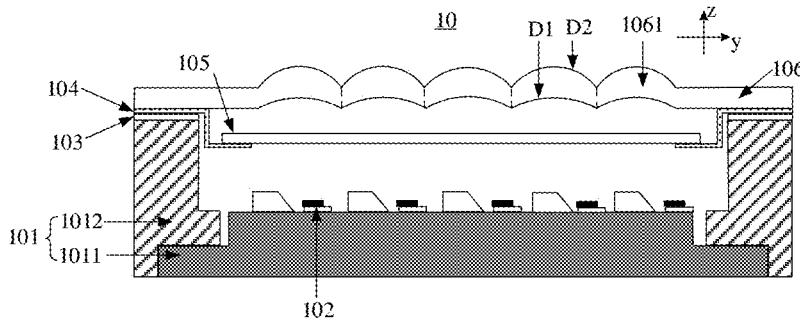
FIG. 21
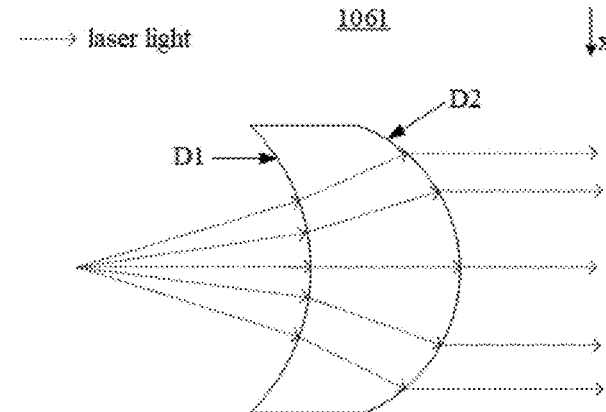
FIG. 22
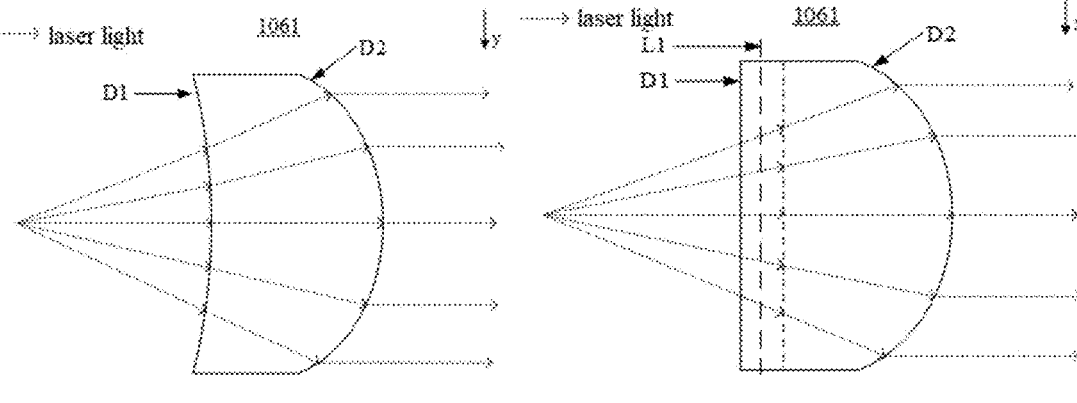
FIG. 23                  FIG. 24

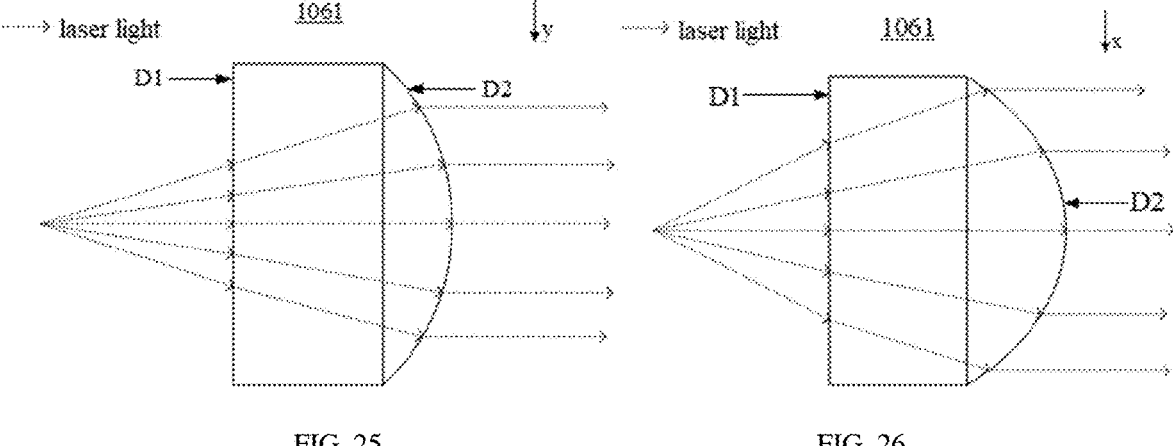
FIG. 25                          FIG. 26

LASER PROJECTION APPARATUS

CROSS-REFERENCE TO RELATED APPLICATIONS

The present application is a continuation application of international application No. PCT/CN2022/117366, filed on Sep. 6, 2022, which claims priority to Chinese Patent Application No. 202111038583.3 filed on Sep. 6, 2021, Chinese Patent Application No. 202111037630.2 filed on Sep. 6, 2021, Chinese Patent Application No. 202111045935.8 filed on Sep. 7, 2021, and Chinese Patent Application No. 202111669286.9 filed on Dec. 31, 2021, the disclosures of which are herein incorporated by reference in their entireties.

TECHNICAL FIELD

The present disclosure relates to the field of display technologies, and in particular, relates to a laser projection apparatus.

BACKGROUND

The laser projection apparatus includes a light source assembly, a light-modulating assembly, and a projection lens. An illumination beam provided by the light source assembly is modulated by the light-modulating assembly into a projection beam, which is projected onto a screen or a wall by the projection lens to form a projection image. The light source assembly includes a laser, and a plurality of light-emitting chips are packaged in the laser. The plurality of light-emitting chips are configured to emit laser light, such that the laser light forms the illumination beam.

SUMMARY

Some embodiments of the present disclosure provide a laser projection apparatus. The laser projection apparatus includes a light source assembly, a light-modulating assembly, and a projection lens. The light source assembly is configured to provide an illumination beam. The light-modulating assembly is configured to modulate the illumination beam with an image signal to acquire a projection beam. The lens is configured to project the projection beam into an image. The light source assembly includes a base plate, a frame, a plurality of light-emitting chips, a metal ring structure, a metal cover plate, and a light-transmitting layer. The frame is disposed on the base plate, and an accommodating space is defined between the base plate and the frame. The plurality of light-emitting chips are disposed in the accommodating space and configured to emit laser light. The laser light is emitted from the accommodating space in a direction distal from the base plate to form the illumination beam. The metal ring structure is configured to be fixed to the frame, so as to fixedly connect the frame with the metal cover plate in a welding manner of local heating. An outer edge of the metal cover plate is fixed to one side of the metal ring structure distal from the base plate. An edge of the light-transmitting layer is fixed to an inner edge of the metal cover plate.

BRIEF DESCRIPTION OF DRAWINGS

To describe the technical solutions in the present disclosure more clearly, the following briefly introduces the accompanying drawings required to be used in some embodiments of the present disclosure. However, the accompanying drawings in the following descriptions are merely accompanying drawings of some embodiments of the present disclosure, and a person of ordinary skill in the art may still derive other accompanying drawings from these accompanying drawings. In addition, the accompanying drawings in the following descriptions may be regarded as schematic diagrams, and do not limit actual sizes of products, actual flows of methods, actual timing sequences of signals, and the like involved in the embodiments of the present disclosure.

FIG. 21 is yet another structural diagram of a laser according to some embodiments;

FIG. 22 is a structural diagram of a collimating lens according to some embodiments;

FIG. 23 is another structural diagram of a collimating lens according to some embodiments;

FIG. 24 is yet another structural diagram of a collimating lens according to some embodiments;

FIG. 25 is yet another structural diagram of a collimating lens according to some embodiments; and FIG. 26 is yet another structural diagram of a collimating lens according to some embodiments.

REFERENCE SIGNS

Figure 1:
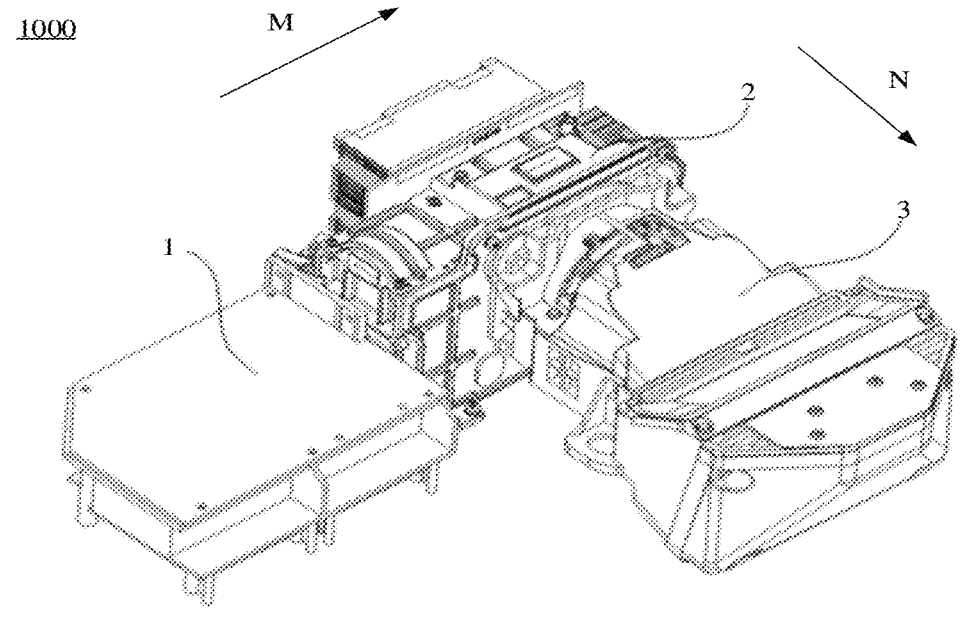
FIG. 1 is a structural diagram of a laser projection apparatus according to some embodiments.

Laser projection apparatus 1000;

3

Light source assembly 1; laser 10; package 101; base plate 1011; first region A1; second region A2; frame 1012; first protrusion portion 10121; second protrusion portion 10122; light-emitting chip 102; metal ring structure 103; metal cover plate 104; light-transmitting layer 105; collimating lens group 106; collimating lens 1061; first surface D1; second surface D2; heat sink 107; reflecting prism 108; light-combining mirror assembly 12; light concentration assembly 13; diffusion wheel 14; green light filter 141; blue light filter; 142; red light filter 143; driving part 144;

Light-modulating assembly 2; diffusion assembly 21; convergence assembly 22; transmission assembly 23; digital micro-mirror device 24; micro-reflective mirror 241; light absorption component 242; prism assembly 25;

Projection lens 3.

DETAILED DESCRIPTION

The technical solutions in some embodiments of the present disclosure will be clearly and completely described below in conjunction with the accompanying drawings in the embodiments of the disclosure. However, the described embodiments are only a part of the embodiments of the present disclosure, and not all of the embodiments of the present disclosure. Based on the embodiments according to the present disclosure, all other embodiments obtained by those ordinary skilled in the art fall within the scope of protection of the present disclosure.

Unless the context requires otherwise, throughout the whole description and claims, the term "include" and its other forms, such as the third person singular form "includes" and the present participle form "including," are interpreted as open and inclusive, that is, "include, but not limited to". In the illustrations of the description, the terms "one embodiment," "some embodiments," "exemplary embodiments," "example," "specific example," or "some examples" and the like are intended to indicate that specific features, structures, materials or characteristics related to this embodiment or example are included in at least one embodiment or example of the present disclosure. The schematic representations of the above terms do not necessarily refer to the same embodiment or example. Furthermore, the described specific features, structures, materials, or characteristics may be included in any one or more embodiments or examples in any suitable manner.

Hereinafter, the terms "first" and "second" are only configured for descriptive purposes, and not understood as indicating or implying relative importance or implicitly indicating the quantity of indicated technical features. Therefore, the features defined as "first" and "second" can include one or more of these features explicitly or implicitly. In the descriptions of the embodiments of the present disclosure, unless otherwise specified, "plurality" means two or more.

When describing some embodiments, the expression "connected" and its derivations are possibly used. For example, the term "connected" is possibly used when describing some embodiments to indicate that two or more components are in direct physical contact or electrical contact with each other. The embodiments disclosed herein are not necessarily limited to the contents herein.

As used herein, "parallel," "perpendicular" and "equal" include the stated situation and the situations similar to the stated situation, and the range of the similar situations is within an acceptable deviation range, which is determined by those ordinary skilled in the art in consideration of measurements being in discussion and errors related to the measurements of specific quantities (i.e., the limitations of a measurement system). For example, the "parallel" includes absolute parallel and approximate parallel, where the acceptable deviation range of the approximate parallel may be within 5 degrees, for example; and the "perpendicular" includes absolute perpendicular and approximate perpendicular, where the acceptable deviation range of the approximate perpendicular may also be within 5 degrees, for example. The "equal" includes absolute equal and approximate equal, where the acceptable deviation range of the approximate equal may be that the difference value between the equal two is less than or equal to 5% of either one, for example.

Some embodiments of the present disclosure provide a laser projection apparatus 1000. As shown in FIG. 1, the laser projection apparatus 1000 includes a light source assembly 1, a light-modulating assembly 2, and a projection lens 3. The light source assembly 1 is configured to provide an illumination beam. The light-modulating assembly 2 is configured to modulate the illumination beam provided by the light source assembly 1 with an image signal to acquire a projection beam. The projection lens 3 is configured to project the projection beam onto a screen or a wall for imaging.

The light source assembly 1, the light-modulating assembly 2, and the projection lens 3 are sequentially connected along a propagation direction of the illumination beam. In some embodiments, one end of the light-modulating assembly 2 is connected to the light source assembly 1, and the light source assembly 1 and the light-modulating assembly 2 are disposed along an emergent direction of the illumination beam of the laser projection apparatus 1000 (referring to direction M shown in FIG. 1). The other end of the light-modulating assembly 2 is connected to the projection lens 3, and the light-modulating assembly 2 and the projection lens 3 are disposed along an emergent direction of the projection beam of the laser projection apparatus 1000 (referring to direction N shown in FIG. 1).

As shown in FIG. 1, In some embodiments, the emergent direction M of the illumination beam of the laser projection apparatus 1000 is substantially perpendicular to the emergent direction N of the projection beam of the laser projection apparatus 1000. In this way, the structural arrangement of the laser projection apparatus 1000 can be reasonable, and a too long optical path of the laser projection apparatus 1000 in a certain direction (for example, the direction M or the direction N) is avoided.

In some embodiments, the light source assembly 1 may sequentially provide lights of three primary colors of light (i.e., red light, green light, and blue light). In some other embodiments, the light source assembly 1 may simultaneously output lights of three primary colors to continuously emit white light. In addition, the illumination beam provided by the light source assembly 1 also includes light other than the lights of three primary colors, such as yellow light. The light source assembly 1 includes a laser that can emit light of at least one color, such as blue laser light.

Figure 2:
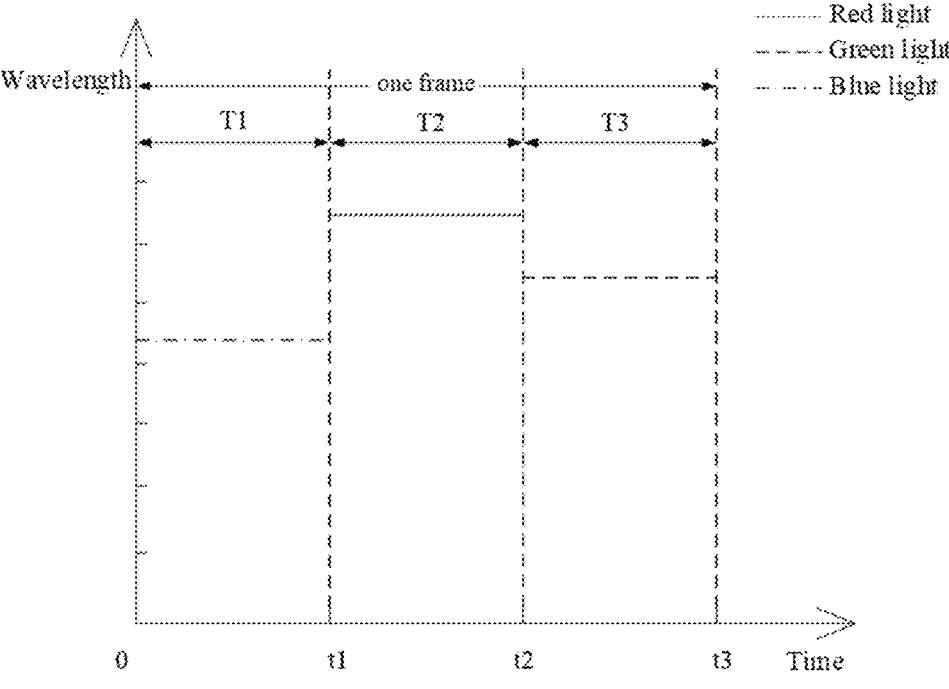
FIG. 2 is a timing sequence diagram of a light source assembly in a laser projection apparatus according to some embodiments.

In some embodiments, as shown in FIG. 2, in a projection process of one frame of an image, the light source assembly 1 sequentially outputs blue, red, and green laser beams. Exemplarily, the light source assembly 1 outputs a blue laser light in a first time period T1, a red laser light in a second time period T2, and a green laser light in a third time period T3. In the embodiments, the time for the light source assembly 1 to complete a round of sequential output of respective primary color beams is one period for the light source assembly 1 to output the primary color beams. In a display period of one frame of an image, the light source assembly 1 performs one round of sequential output of respective primary color beams. Therefore, the display period of one frame of the image is equal to one period for the light source assembly 1 to output the primary color beams, and is equal to a sum of the first time period T1, the second time period T2, and the third time period T3. In the embodiments, due to the phenomenon of vision persistence, human eyes will color-superimpose the blue laser beam, the red laser beam, and the green laser beam that are sequentially output, such that the human eyes perceive white light formed by a mixture of beams of the three primary colors.

Hereinafter, structures of the above light source assembly 1, light-modulating assembly 2, and projection lens 3 will be exemplarily explained mainly in combination with the accompanying drawings.

Figures 3, 4, 5:
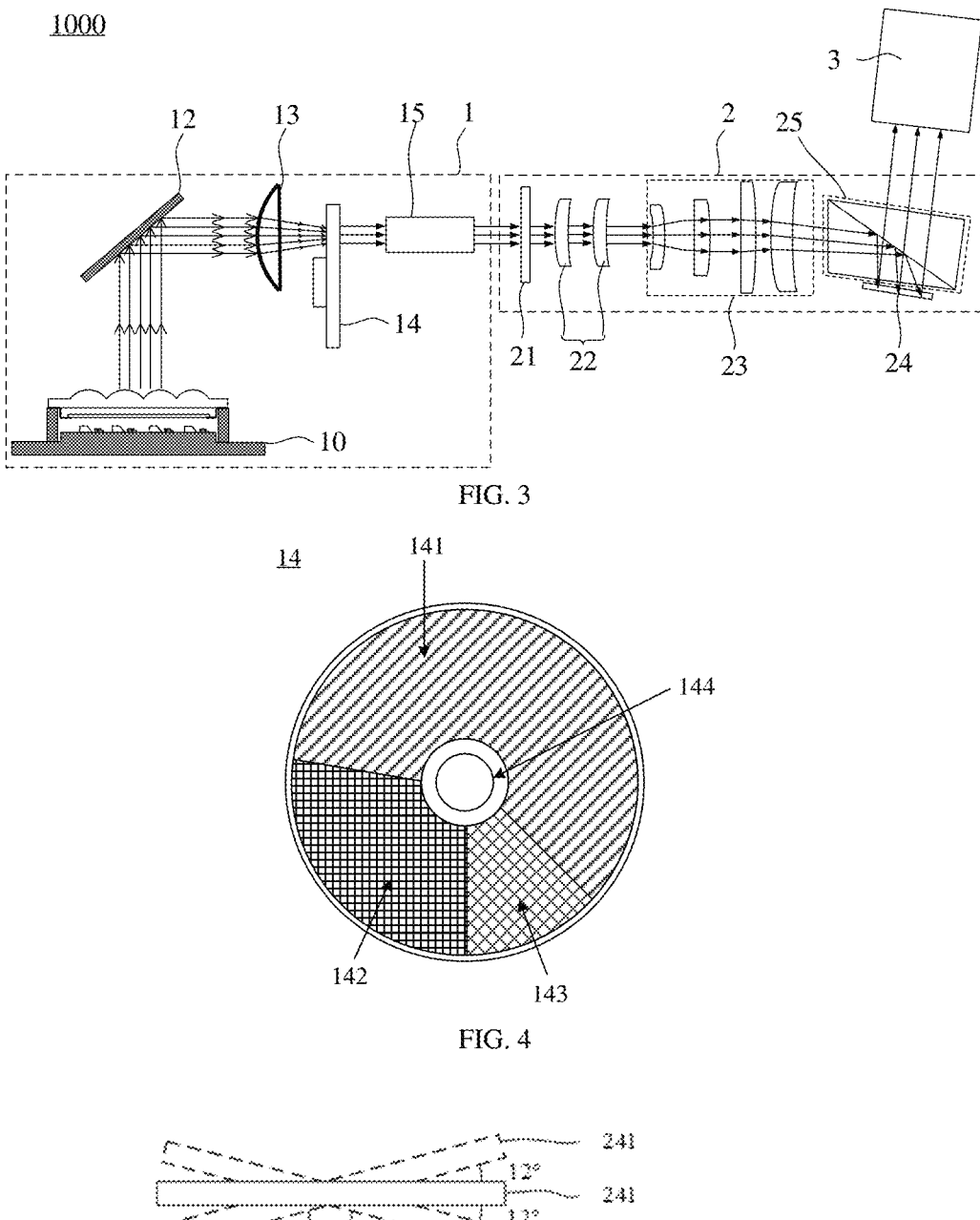
FIG. 3 is an optical path diagram in a laser projection apparatus according to some embodiments.
FIG. 4 is a structural diagram of a diffusion wheel according to some embodiments.
FIG. 5 is a position diagram of swinging of a micro-reflective mirror in a digital micro-mirror device.

Referring to FIG. 3, the light source assembly 1 includes a laser 10, a light-combining mirror assembly 12, a light concentration assembly 13, a diffusion wheel 14, and a light homogenization assembly 15. The laser 10 is configured to provide the illumination beam. The light-combining mirror assembly 12 is disposed on a light-output side of the laser 10, and is configured to reflect the illumination beam provided by the laser 10 to the light concentration assembly 13. The light concentration assembly 13 is disposed on a light-output side of the light-combining mirror assembly 12, and is configured to condense the illumination beam from the light-combining mirror assembly 12. The diffusion wheel 14 is disposed on a light-output side of the light concentration assembly 13, and is configured to filter the illumination beam condensed by the light concentration assembly 13 to sequentially output the lights of three primary colors. The light homogenization assembly 15 is disposed on a light-output side of the diffusion wheel 14, and is configured to homogenize the illumination beam filtered by the diffusion wheel 14.

In some embodiments, the light-combining mirror assembly 12 may be a dichroic mirror. When the light source assembly 1 outputs the lights of three primary colors simultaneously or sequentially (that is, the laser 10 outputs the lights of three primary colors simultaneously or sequentially), the light-combining mirror assembly 12 may reflect the red laser light, green laser light, and blue laser light emitted by the laser 10 to the light concentration assembly 13.

In some embodiments, the light concentration assembly 13 includes at least one plano-convex lens, and a convex surface of the at least one plano-convex lens is towards a light-output direction of the light-combining mirror assembly 12.

In some embodiments, the diffusion wheel 14 may be a whole diffusion sheet that rotates to transmit laser light of various colors. The diffusion wheel 14 may also be a partitioned diffusion sheet, and the diffusion sheets of different partitions may be set with different diffusion angles to have different degrees of diffusion for lasers of different colors incident to the different partitions. As shown in FIG. 4, the diffusion wheel 14 may include a green light diffusion filter 141, a blue light diffusion filter 142, a red light diffusion filter 143, and a driving part 144. The driving part 144 is configured to drive the diffusion wheel 14 to rotate, such that the illumination beam emitted by the laser 10 is transmitted by the light diffusion filters of different colors within the display period of one frame of the image. In some embodiments, when the laser 10 outputs the lights of three primary colors at the same time, and the diffusion wheel 14 rotates to a position where the red light diffusion filter 143 covers a light spot of the lights of three primary colors, the light beams of other colors in the lights of three primary colors except the red light beam are blocked, and the red light beam is transmitted through the diffusion wheel 14 by the red light diffusion filter 143.

In some embodiments, the light homogenization assembly 15 may be a light pipe. The light pipe may be a pipe device formed by four planar reflectors stitched together, that is, a hollow light pipe. The illumination beam is reflected a plurality of times in the light pipe to achieve the effect of light homogenization. In addition, the light homogenization assembly 15 may also adopt a solid light pipe. For example, a light entrance and a light exit of the light pipe are rectangles consistent in shape and area, and the illumination beam enters from the light entrance of the light pipe and is then emitted from the light exit of the light pipe, such that light beam homogenization and light spot optimization are completed in the process of passing through the light pipe.

It should be noted that when the light homogenization assembly 15 is a light pipe, the light source assembly 1 includes the light pipe, and the light pipe may not be disposed in the light-modulating assembly 2; and when the light homogenization assembly 15 is other components (such as compound eye lens set) except the light pipe, the light-modulating assembly 2 further includes the above light pipe to receive the illumination beam from the light source assembly 1.

The illumination beam emitted by the light source assembly 1 enters the light-modulating assembly 2. The core component of the light-modulating assembly 2 is the optical modulation device. In a digital light processing (DLP) projection architecture, the light modulation device is a digital micro-mirror device (DMD). However, the present disclosure does not limit the architecture to which the light-modulating assembly 2 is applied, types of the optical modulation devices, and the like.

Referring to FIG. 3, the light modulation device of the light-modulating assembly 2 is a digital micro-mirror device 24. The digital micro-mirror device 24 is disposed on a light-output side of the light source assembly 1, and is configured to modulate the illumination beam provided by the light source assembly 1 with an image signal to acquire a projection beam and reflect the projection beam into the projection lens 3. As the digital micro-mirror device 24 can control the projection beam to display different colors and brightness for different pixels of a to-be-displayed image, so as to finally form the projection image, the digital micro-mirror device 24 is also called a light modulation device (or light valve). In addition, according to the number of the light modulation device used in the light-modulating assembly 2, the light-modulating assembly 2 may be divided into a single-chip system, a two-chip system, or a three-chip system.

As shown in FIG. 5, in the DLP projection architecture, each micro-reflective mirror 241 is equivalent to a digital switch, which can swing within a range of +/−12 degrees or +/−17 degrees under the action of an external force. FIG. 5 illustrates an example in which each micro-reflective mirror 241 can swing within the range of +/−12 degrees.

Figure 6:
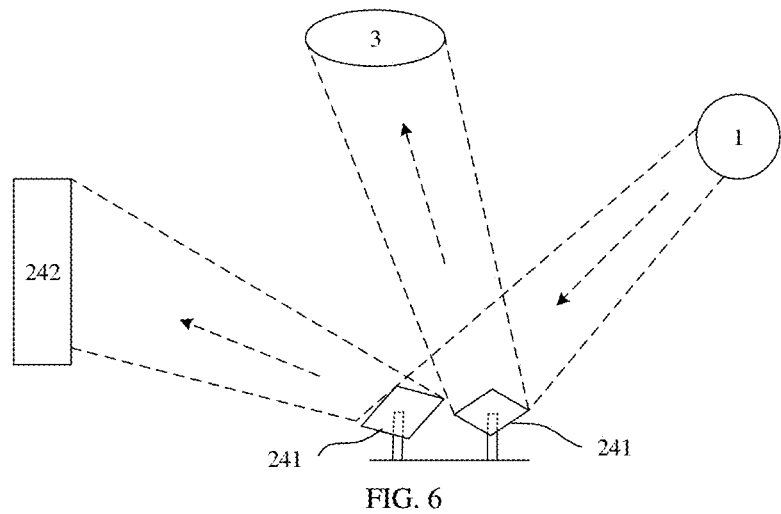
FIG. 6 is a working schematic diagram of a micro-reflective mirror according to some embodiments.

As shown in FIG. 6, the light reflected by the micro-reflective mirrors 241 at a negative deflection angle is called OFF light. The OFF light is invalid light. The light reflected by the micro-reflective mirrors 241 at a positive deflection angle is called ON light. The ON light is an effective light beam which is irradiated by the illumination beam received by the micro-reflective mirrors 241 on the surface of the digital micro-mirror device 24 and is incident to the projection lens 3 through the positive deflection angle for projection imaging. An on state of the micro-reflective mirrors 241 is a state that the micro-reflective mirrors 241 are in and can be maintained when the illumination beam emitted from the light source assembly 1 can enter the projection lens 3 after being reflected by the micro-reflective mirrors 241, that is, a state that the micro-reflective mirrors 241 are at the positive deflection angle. An off state of the micro-reflective mirrors 241 is a state that the micro-reflective mirrors 241 are in and can be maintained when the illumination beam emitted from the light source assembly 1 does not enter the projection lens 3 after being reflected by the micro-reflective mirrors 241, that is, a state that the micro-reflective mirrors 241 are at the negative deflection angle.

In the display period of one frame image, part or all of the micro-reflective mirrors 241 will be switched at least once between the on state and the off state, so as to realize a gray scale of each pixel in one frame image according to respective durations of the micro-reflective mirrors 241 in the on state and the off state. For example, when the pixels have 256 gray scales of 0 to 255, the micro-reflective mirror 241 corresponding to the pixel of gray scale 0 is in the off state within the whole display period of the one frame image, the micro-reflective mirror 241 corresponding to the pixel of gray scale 255 is in the on state within the whole display period of one frame image, and the micro-reflective mirror 241 corresponding to the pixel of gray scale 127 is in the on state half of the time and in the off state the other half of the time within the display period of one frame image. Therefore, by controlling the states and the maintenance time of each state of each micro-reflective mirror 241 in the digital micro-mirror device 24 within the display period of one frame image through the image signal, the brightness (gray scale) of the pixel corresponding to the micro-reflective mirror 241 can be controlled, thereby modulating the illumination beam projected to the digital micro-mirror device 24.

In some embodiments, with continued reference to FIG. 3, the light-modulating assembly 2 further includes a diffusion assembly 21, a convergence assembly 22, a transmission assembly 23, and a prism assembly 25. It should be noted that the light-modulating assembly 2 may also include fewer or more components than those shown in FIG. 3, which is not limited by the present disclosure.

In this embodiment, the diffusion assembly 21 is disposed on the light-output side of the light source assembly 1, and is configured to diffuse the illumination beam from the light source assembly 1. The convergence assembly 22 is disposed on a light-output side of the diffusion assembly 21, and is configured to converge the illumination beam diffused by the diffusion assembly 21. The transmission assembly 23 is disposed on a light-output side of the convergence assembly 22, and is configured to transmit the illumination beam converged by the convergence assembly 22 to the prism assembly 25. The prism assembly 25 reflects the illumination beam to the digital micro-mirror device 24.

Figure 7:
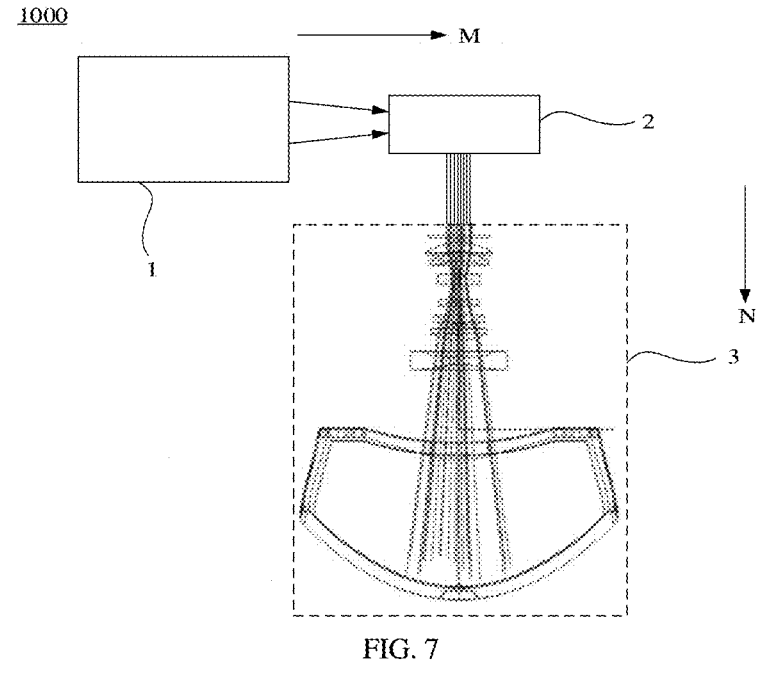
FIG. 7 is another structural diagram of a laser projection apparatus according to some embodiments.

As shown in FIG. 7, the projection lens 3 includes combinations of a plurality of lenses, which are usually divided into three groups, namely, a front group, a middle group, and a back group, or two segments, namely, a front group and a back group. The front group is a lens group proximal to a light-output side of the laser projection apparatus 1000 (i.e., the side of the projection lens 3 distal from the light-modulating assembly 2 in the direction N shown in FIG. 7), and the back group is a lens group proximal to a light-output side of the light-modulating assembly 2 (i.e., the side of the projection lens 3 proximal to the light-modulating assembly 2 in the direction N shown in FIG. 7).

Figure 8:
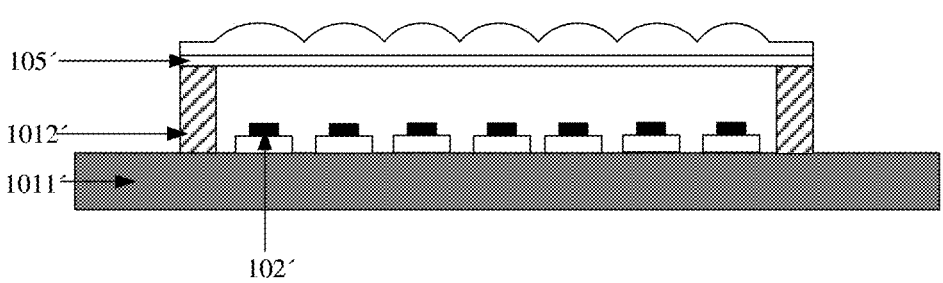
FIG. 8 is a structural diagram of a laser in the related art.

In the related art, as shown in FIG. 8, the laser 10' includes a base plate 1011', a frame' 1012, a plurality of light-emitting chips 102', and a light-transmitting layer 105'. The frame 1012' is made of ceramic, and the light-transmitting layer 105' is made of glass. The frame 1012' and the base plate 1011' enclose an accommodating space, and the plurality of light-emitting chips 102' are disposed in the accommodating space. The edge of the light-transmitting layer 105' is fixed to one side of the frame 1012' distal from the base plate 1011', so as to close the accommodating space. When manufacturing the laser 10', the plurality of light-emitting chips 102' are fixed in the accommodating space. Then, the light-transmitting layer 105' is placed on the side where an opening of the frame 1012' is located, and solder is placed between the light-transmitting layer 105' and the frame 1012'. The solder is usually gold-tin. Next, the assembled structure of the base plate 1011' with the light-transmitting layer 105' and the solder placed thereon, the frame 1012', and the light-emitting chips 102' is put into a high temperature furnace and heated to a melting temperature of the solder (320° C. to 350° C.), so as to melt and seal the light-transmitting layer 105' and the frame 1012' by melting the solder in the high temperature state, thereby realizing fixation of the light-transmitting layer 105'.

In view of the above technical problem in the related art, inventors of the present disclosure found through research that in the process of manufacturing the laser 10' by using the methods in the related art, the soldering manner is singular and expensive, and all components in the laser 10' need to be heated together to the melting temperature of the solder, and this heating process will cause a thermal damage to the plurality of light-emitting chips 102', which will shorten a service life of the light-emitting chips 102' or even make the same not work normally, leading to a low reliability of the laser 10'.

One solution in the related art is to connect the frame 1012' and the metal cover plate 104' in a bonding manner. In this way, heating of the plurality of light-emitting chips 102' can be avoided during the manufacturing process of the laser 10'. However, as the stability of bonding connection is lower than that of welding connection and poor sealing performance of the bonding connection, the above solution will reduce the reliability of the connection between the frame 1012' and the metal cover plate 104'.

For the technical problems existing in the above related art and possible solution, some embodiments of the present disclosure provide a laser projection apparatus 1000, which can improve the reliability of the laser 10' on the premise of facilitating the lightweight design of the laser 10' and ensuring the reliability of the connection between the frame 1012' and the metal cover plate 104'.

Figures 9, 10:
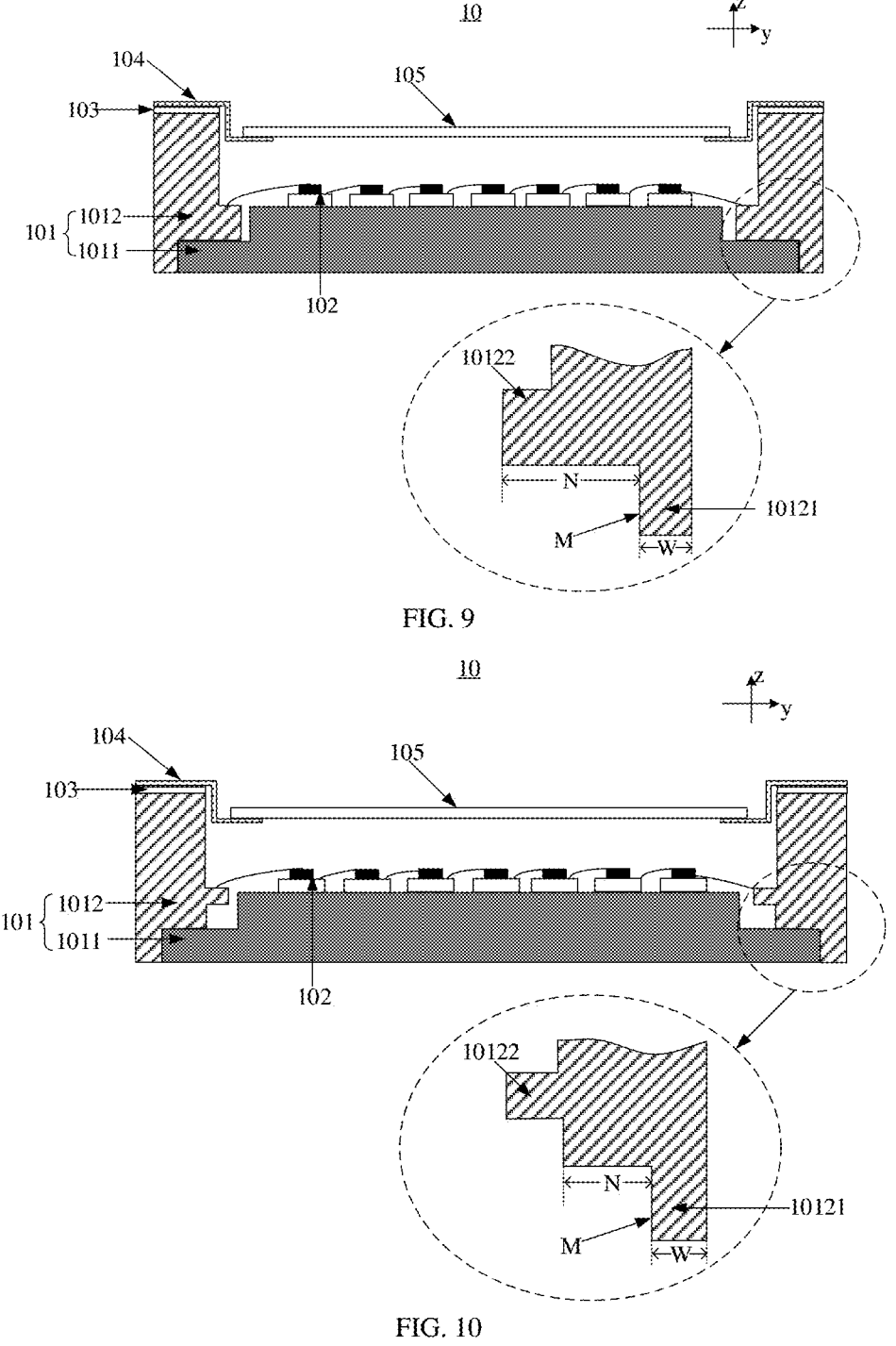
FIG. 9 is a structural diagram of a laser according to some embodiments.
FIG. 10 is another structural diagram of a laser according to some embodiments.

As shown in FIG. 9, the laser 10 in the laser projection apparatus 1000 includes a base plate 1011, a frame 1012, a plurality of light-emitting chips 102, a metal ring structure 103, a metal cover plate 104, and a light-transmitting layer 105.

The material of the frame 1012 is ceramic, such that the overall weight of the laser 10 is lighter, facilitating a lightweight design of this laser 10.

The frame 1012 is disposed on the base plate 1011, and an accommodating space S is defined between the base plate 1011 and the frame 1012. The structure consisting of the base plate 1011 and the frame 1012 may be called package 101.

The plurality of light-emitting chips 102 are disposed in the accommodating space S and are configured to emit laser light. The laser light is emitted from the accommodating space S in a direction distal from the base plate 1011 to form an illumination beam. The metal ring structure 103 is configured to be fixed to the frame 1012, so as to fixedly connect the frame 1012 and the metal cover plate 104 in a welding manner of local heating. An outer edge of the metal cover plate 104 is fixed to one side of the metal ring structure 103 distal from the base plate 1011. An edge of the light-transmitting layer 105 is fixed to an inner edge of the metal cover plate 104.

In the laser projection apparatus 1000 according to the embodiments of the present disclosure, on the premise that the frame 1012 of the laser 10 is made of ceramic, a metal ring structure 103 and a metal cover plate 104 are additionally provided. In this way, in the manufacturing process of the laser 10, the base plate 1011, the frame 1012, and the metal ring structure 103 can be welded into a base assembly first, and the plurality of light-emitting chips 102 are fixed in the accommodating space S. Then, the light-transmitting layer 105 and the metal cover plate 104 are welded into an upper cover assembly, then the upper cover assembly is placed on the base assembly, and the outer edge of the metal cover plate 104 and the metal ring structure 103 are connected and fixed in a metal welding manner, so as to complete the manufacture of the laser 10. As the light-transmitting layer 105 is connected and fixed to the frame 1012 using the welding manner between the metal ring structure 103 and the metal cover plate 104, there is no need to put the assembled structure of the base plate 1011 with the light-transmitting layer 105 and the solder placed thereon, the frame 1012, and the light-emitting chips 102 into a high temperature furnace. Therefore, the laser projection apparatus 1000 according to the embodiments of the present disclosure can reduce the probability that the plurality of light-emitting chips 102 are damaged in the manufacturing process of the laser 10, thereby improving the reliability of the laser 10.

In some embodiments, the above metal welding manner of local heating may be resistance welding (for example, parallel sealing welding) or laser welding, and the like. In the case that the upper cover assembly and the base assembly are connected by the resistance welding. By completing the welding by heating only the metal surface of the metal ring structure 103 and the connecting portion of the metal cover plate 104, not only is a welding seam structure between the outer edge of the metal cover plate 104 and the metal ring structure 103 is relatively uniform, but also the weld sealing is good and the weld quality is better. In the case of connecting the upper cover assembly and the base assembly by laser welding, the welding process is faster, and the deformation of the outer edge of the metal cover plate 104 and the metal ring structure 103 is smaller.

In some embodiments, the above upper cover assembly may close the accommodating space S. In this way, moisture, oxygen, and the like in an external environment of the laser 10 can be prevented from eroding the plurality of light-emitting chips 102, thereby prolonging the service life of the light-emitting chips 102. It should be noted that the above closing the accommodating space S allows assembling errors. That is to say, the closed accommodating space S does not require absolute sealing.

In some embodiments, with continued reference to FIG. 9, the light-emitting chips 102 are disposed on the base plate 1011. In this way, the heat generated by the light-emitting chips 102 during working can be dissipated to the outside of the laser 10 through the base plate 1011, which is conductive to improving heat dissipation efficiency of the laser 10.

It should be noted that the following embodiments illustrate an example where the light-emitting chips 102 are disposed on the base plate 1011, and the light-emitting chips 102 may also be disposed at other positions in the accommodating space S. For example, the light-emitting chips 102 may be disposed on the surface of one side of the frame 1012 towards the accommodating space S, and emit laser light towards a direction distal from the base plate 1011.

In some embodiments, a material of the metal ring structure 103 includes an iron-nickel alloy. In this way, as an expansion coefficient of the iron-nickel alloy is close to that of the ceramic, when the metal ring structure 103 is made of the iron-nickel alloy and the frame 1012 is made of the ceramic, the metal ring structure 103 and the frame 1012 can be more closely combined.

It should be noted that the material of the metal ring structure 103 may also be other metals except the iron-nickel alloy, or non-metallic materials suitable for the welding manner of local heating, which is not limited in the present disclosure.

In some embodiments, with continued reference to FIG. 9, the metal ring structure 103 is fixed to one side of the frame 1012 distal from the base plate 1011. In some other embodiments, the metal ring structure 103 may be fixed to one side of the frame 1012 towards the accommodating space S.

In some embodiments, with continued reference to FIG. 9, an outer edge W of the end portion of the frame 1012 proximal to the base plate 1011 protrudes relative to an inner edge N of the end portion to form a first protrusion portion 10121. The first protrusion portion 10121 surrounds the base plate 1011. The inner edge N of the end portion is fixed to one side of the base plate 1011 towards the accommodating space S, and a side surface M of the first protrusion portion 10121 towards the base plate 1011 is fixed to a side surface of the base plate 1011.

In this way, a contact area between the base plate 1011 and the frame 1012 can be increased, and the frame 1012 can be more stably disposed on the base plate 1011. In addition, as the material of the base plate 1011 is usually metal, when the frame 1012 is made of the ceramic material, the hardness of the frame 1012 is higher than that of the base plate 1011, and the frame 1012 can protect the base plate 1011 and prevent the base plate 1011 from collision, deformation, and the like under the action of an external force.

In some embodiments, the outer edge region W of the end portion of the frame 1012 proximal to the base plate 1011 is flush with the surface of one side of the base plate 1011 distal from the accommodating space S. In this way, the outer contour of an overall structure of the laser 10 can be relatively flat, and the probability that the laser 10 collides against other components in the laser projection apparatus 1000 is reduced, thereby improving the reliability of the laser projection apparatus 1000.

In some embodiments, with continued reference to FIG. 9, the inner wall of the frame 1012 protrudes towards the accommodating space S to form a second protrusion portion 10122. In the embodiments, the laser 10 further includes a plurality of conductive layers. The plurality of conductive layers are disposed on one side of the second protrusion portion 10122 distal from the base plate 1011, and are configured to be coupled with the plurality of light-emitting chips 102. In this way, the plurality of conductive layers can transmit currents to the plurality of light-emitting chips 102 through an external power supply, thereby supplying power to the plurality of light-emitting chips 102.

The distance between the surface of one side of the second protrusion portion 10122, distal from the base plate 1011, and the surface of one side of the base plate 1011 on which the plurality of light-emitting chips 102 are disposed, is less than a height threshold. That is, the distance between the surface where the plurality of conductive layers are disposed and the surface where the plurality of light-emitting chips 102 are disposed is smaller. As the plurality of conductive layers are coupled with the plurality of light-emitting chips 102 through a plurality of wires, the length of the wires in the embodiments is smaller, and the space occupied by the plurality of wires in the accommodating space S is smaller, which is conductive to a miniaturization design of the laser 10.

In some embodiments, with continued reference to FIG. 9, one side of the second protrusion portion 10122 proximal to the base plate 1011 is fixed to the base plate 1011. In this way, the second protrusion portion 10122 can be supported by the base plate 1011, and the disposing stability of the second protrusion portion 10122 is improved. In some other embodiments, as shown in FIG. 10, there is a gap between one side of the second protrusion portion 10122 proximal to the base plate 1011 and the base plate 1011. In this way, the space occupied by the second protrusion portion 10122 in the accommodating space S is smaller, which is conductive to the miniaturization design of the laser 10.

Figures 11, 12:
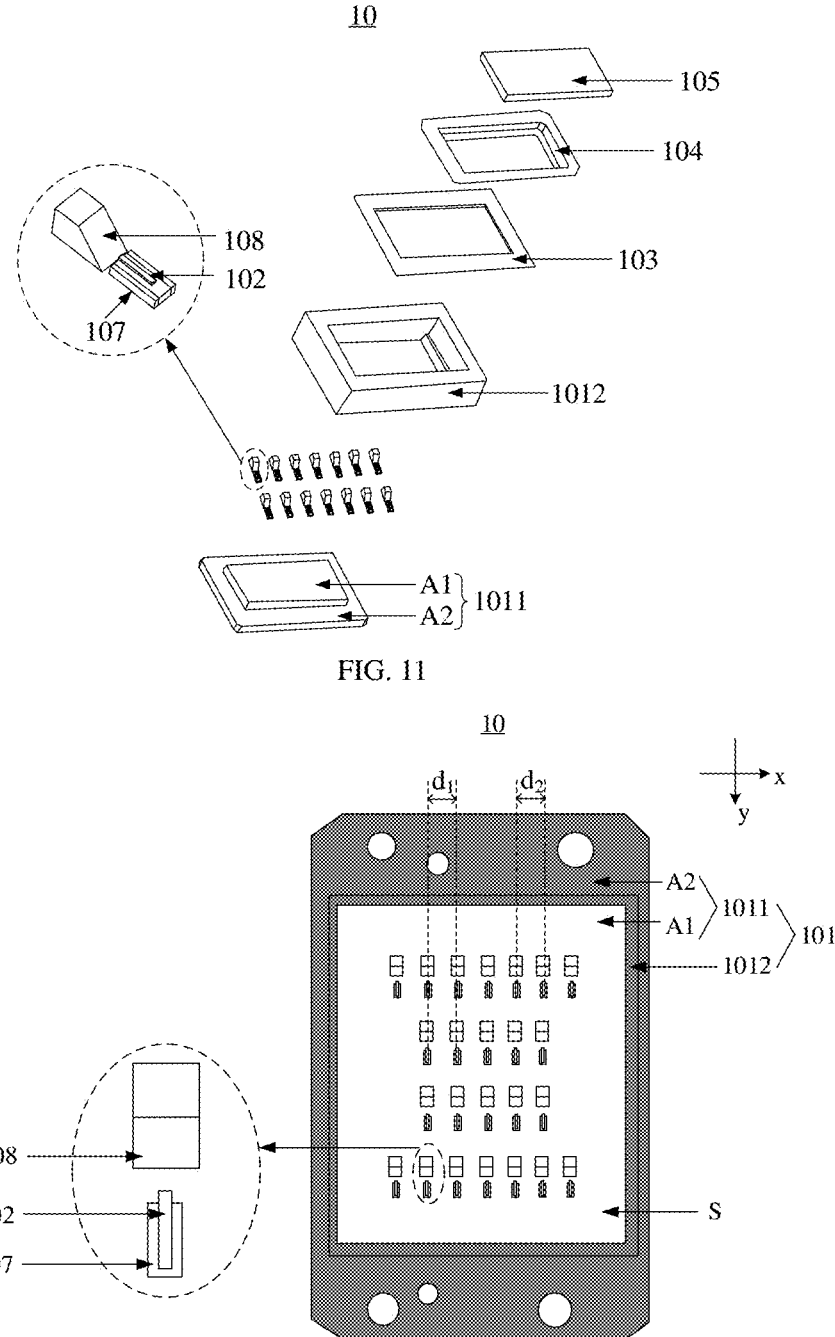
FIG. 11 is an explosion diagram of a laser according to some embodiments.
FIG. 12 is a top view of a laser according to some embodiments.

In some embodiments, as shown in FIG. 11, the base plate 1011 includes a first region A1 and a second region A2. The second region A2 surrounds the first region A1, and the first region A1 protrudes relative to the second region A2. The frame 1012 is fixed in the second region A2, and the plurality of light-emitting chips 102 are disposed in the first region A1.

In this way, the plurality of light-emitting chips 102 can be disposed through the protruded first region A1, so as to reduce the distance between the surface where the plurality of light-emitting chips 102 are disposed and the surface where the above plurality of conductive layers are disposed. Exemplarily, the surface where the plurality of light-emitting chips 102 are disposed may be made flush with the surface where the above plurality of conductive layers are disposed by adjusting a protruding height of the first region A1. In this way, the length of the wires connecting the plurality of conductive layers and the plurality of light-emitting chips 102 can be reduced.

In some embodiments, as shown in FIG. 12, the base plate 1011 includes the first region A1 in which the plurality of light-emitting chips 102 are disposed. The first region A1 includes a first sub-region and a second sub-region and satisfies at least one of: a quantity of the light-emitting chips 102 in the first sub-region is less than a quantity of the light-emitting chips 102 in the second sub-region; or an arrangement density of the light-emitting chips 102 in the first sub-region is less than an arrangement density of the light-emitting chips 102 in the second sub-region.

It should be noted that the above second sub-region may surround the first sub-region. Exemplarily, the second sub-region may surround the first sub-region or semi-surround the first sub-region, and may also be disposed on two opposite sides of the first sub-region. Alternatively, the above second sub-region may be disposed on one side of the first sub-region. The present disclosure does not limit a relative positional relationship between the first sub-region and the second sub-region.

Exemplarily, as shown in FIG. 12, the light-emitting chips 102 in the first sub-region and the light-emitting chips 102 in the second sub-region are arranged in multi-row and multi-column with the x direction as a row direction and the y direction as a column direction respectively. At this time, the plurality of light-emitting chips 102 on the base plate 1011 are disposed in the plurality of rows. In this way, the light-emitting chips 102 in the second sub-region may include the light-emitting chips 102 disposed in the first and fourth rows, and the light-emitting chips 102 in the first sub-region may include the light-emitting chips 102 in the second and third rows.

In the case that the second sub-region surrounds the first sub-region, the first sub-region is closer to the center of the base plate 1011 than the second sub-region, and the first sub-region may also be called a middle region; while the second sub-region is closer to the edge of the base plate 1011 than the first sub-region, and the second sub-region may also be called an edge region.

In some embodiments, the quantity of the light-emitting chips 102 in the first sub-region may refer to a total quantity of the light-emitting chips 102 in the first sub-region and the quantity of the light-emitting chips 102 in the second sub-region may refer to a total quantity of the light-emitting chips 102 in the second sub-region. In some other embodiments, the light-emitting chips 102 in the first sub-region are disposed in a multi-row and multi-column array, and the light-emitting chips 102 in the second sub-region are also disposed in a multi-row and multi-column array. The quantity of the light-emitting chips 102 in the first sub-region may refer to the quantity of one row of light-emitting chips 102 in the first sub-region and the quantity of the light-emitting chips 102 in the second sub-region may refer to the quantity of one row of light-emitting chips 102 in the second sub-region.

In some embodiments, the above arrangement density of the light-emitting chips 102 is the arrangement dense degree of the light-emitting chips 102, and the arrangement density may be characterized by an interval between adjacent light-emitting chips 102. Exemplarily, the greater the interval between adjacent light-emitting chips 102, the smaller the arrangement density of the light-emitting chips 102. It should be noted that FIG. 12 illustrates an example where the quantity of the light-emitting chips 102 in the first sub-region is less than the quantity of the light-emitting chips 102 in the second sub-region, and the arrangement density of the light-emitting chips 102 in the first sub-region is equal to the arrangement density of the light-emitting chips 102 in the second sub-region. Taking FIG. 12 as an example, a first interval $d_1$ between adjacent light-emitting chips 102 in the same row in the first sub-region in the row direction is equal to a second interval $d_2$ between adjacent light-emitting chips 102 in the same row in the second sub-region in the row direction.

In the above embodiments, when the arrangement of the light-emitting chips 102 on the base plate 1011 of the laser 10 satisfies that the quantity of the light-emitting chips 102 in the first sub-region is less than the quantity of the light-emitting chips 102 in the second sub-region, total heat generated by the light-emitting chips 102 in the first sub-region can be reduced, thereby reducing a heat density per unit area of the first sub-region, which is conductive to rapid dissipation of heat generated by the light-emitting chips 102 in the first sub-region.

When the arrangement of the light-emitting chips 102 satisfies that the arrangement density of the light-emitting chips 102 in the first sub-region is less than the arrangement density of the light-emitting chips 102 in the second sub-region, the area of a heat dissipation region of a single light-emitting chip 102 in the first sub-region can be increased, which is conductive to the rapid dissipation of the heat generated by the light-emitting chips 102 in the first sub-region.

Therefore, the laser projection apparatus 1000 in the above embodiments can enhance the heat dissipation effect of the light-emitting chips 102 in the first sub-region of the laser 10, reduce the probability of thermal damage to the light-emitting chips 102 in the first sub-region due to heat buildup, and further improve the reliability of the laser projection apparatus 1000.

In addition, as the reliability of the laser 10 is improved, more light-emitting chips 102 can be disposed in the laser 10 on the premise of ensuring normal working of the plurality of light-emitting chips 102 in the laser 10. In this way, the brightness of the illumination beam provided by the laser 10 can be improved, thereby improving the display effect of the projection image projected by the laser projection apparatus 1000.

Figures 13, 14:
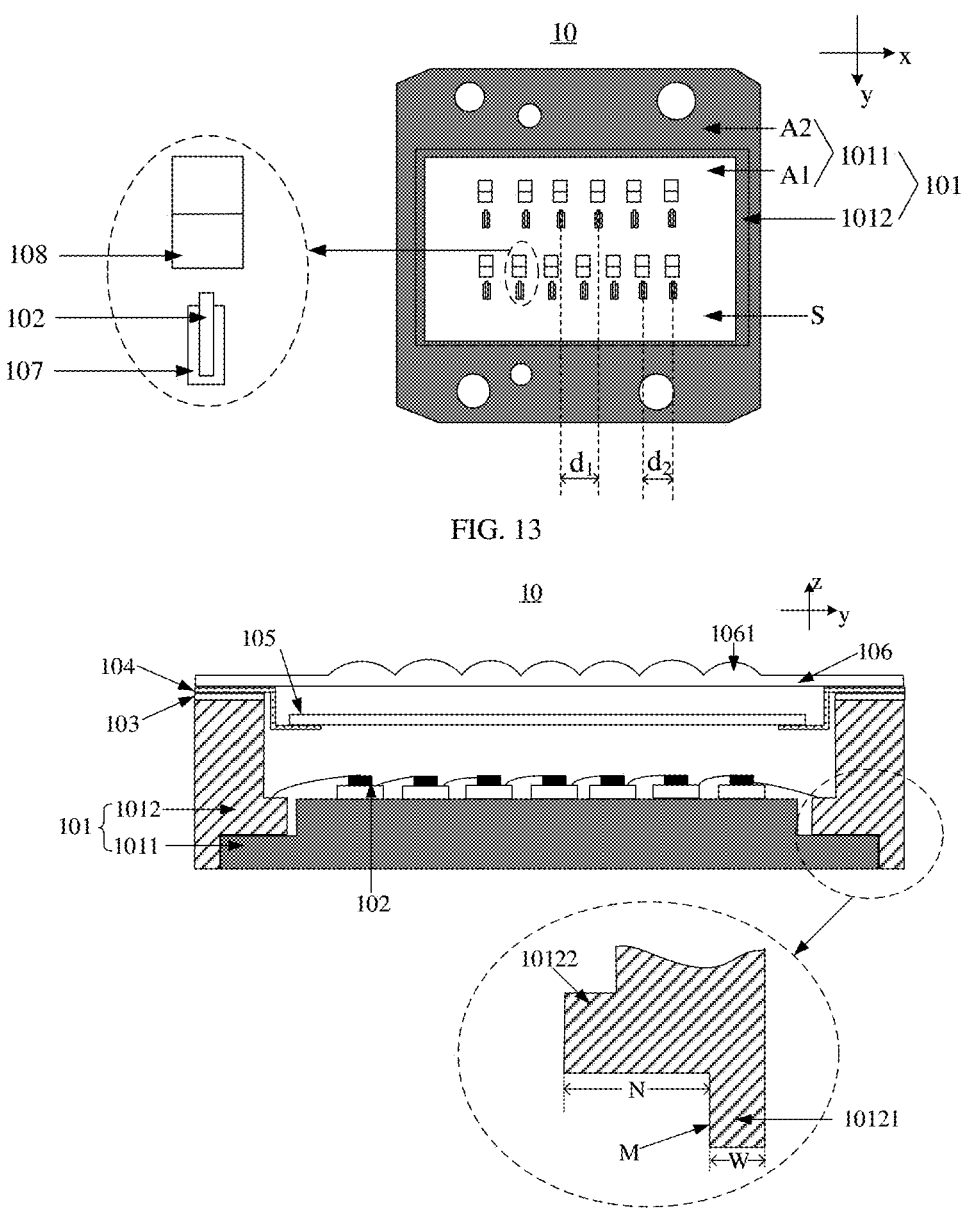
FIG. 13 is another top view of a laser according to some embodiments.
FIG. 14 is yet another structural diagram of a laser according to some embodiments.

In some embodiments, as shown in FIG. 13, the quantity of the light-emitting chips 102 in the first sub-region is less than the quantity of the light-emitting chips 102 in the second sub-region, and the arrangement density of the light-emitting chips 102 in the first sub-region is less than the arrangement density of the light-emitting chips 102 in the second sub-region.

In FIG. 13, the plurality of light-emitting chips 102 are arranged in two rows, and the first sub-region is disposed on one side of the second sub-region. The quantity of the light-emitting chips 102 (first row of light-emitting chips 102) in the first sub-region is less than the quantity of the light-emitting chips 102 (second row of light-emitting chips 102) in the second sub-region, and the first interval $d_1$ between adjacent light-emitting chips 102 in the same row in the first sub-region in the row direction is greater than the second interval $d_2$ between adjacent light-emitting chips 102 in the same row in the second sub-region in the row direction. In this way, the total heat generated by the light-emitting chips 102 in the first sub-region is less, and the area of the heat dissipation region of a single light-emitting chip 102 in the first sub-region is greater, such that the heat dissipation speed of the light-emitting chips 102 in the first sub-region can be accelerated.

In some embodiments, the plurality of light-emitting chips 102 include a plurality of rows of light-emitting chips 102. In the plurality of rows of light-emitting chips, there is at least one row of light-emitting chips 102 staggered with the adjacent rows of light-emitting chips of the at least one row of light-emitting chips 102. In this way, the distance between the at least one row of light-emitting chips 102 and the adjacent rows of light-emitting chips 102 in the column direction can be increased on the premise of not increasing an arrangement length of the plurality of rows of light-emitting chips 102 in the column direction, thereby increasing the area of the heat dissipation region of the light-emitting chips 102 in the at least one row of light-emitting chips 102 and the adjacent rows of light-emitting chips 102 and accelerating the heat dissipation speed of the laser 10.

It should be noted that the staggered arrangement of two rows of light-emitting chips 102 means that the two rows of light-emitting chips 102 are staggered in the column direction, that is, at least one light-emitting chip 102 in one row of light-emitting chips 102 is not aligned with the light-emitting chips 102 in the other row of light-emitting chips 102 in the column direction. For example, with continued reference to FIG. 13, the first and seventh light-emitting chips 102 in the second row of light-emitting chips 102 in the x direction and the first and sixth light-emitting chips 102 in the first row of light-emitting chips 102 in the x direction are aligned in the y direction. The second to sixth light-emitting chips 102 in the second row of light-emitting chips 102 in the x direction and the light-emitting chips 102 in the first row of light-emitting chips 102 are not aligned in the y direction. At this time, the first row of light-emitting chips 102 is staggered with the second row of light-emitting chips 102.

In some embodiments, the at least one row of light-emitting chips comprises a first row of light-emitting chips and a second row of light-emitting chips, wherein the first row of light-emitting chips emits laser light at a wavelength of a first wavelength, and the second row of light-emitting chips emits laser light at a wavelength of a second wavelength and a third wavelength. The first wavelength is greater than the second wavelength and the second wavelength is greater than the third wavelength. For example, the laser light corresponding to the first wavelength may be a red laser light, the laser light corresponding to the second wavelength may be a green laser light, and the laser light corresponding to the third wavelength may be a blue laser light.

In some embodiments, the laser 10 may only include one type of light-emitting chips 102, and working parameters of the plurality of light-emitting chips 102 in the laser 10 are the same. At this time, the laser 10 may be a monochromatic laser (for example, a blue laser), and the colors of laser light emitted by the plurality of light-emitting chips 102 are the same. The working parameters of the light-emitting chips 102 refer to the parameters that affect working temperature of the light-emitting chips 102 during light emission, such as the wavelength of the emitted laser light.

In some other embodiments, the laser 10 may include a plurality of types of light-emitting chips 102, and the working parameters of different types of light-emitting chips 102 may be different. When different types of light-emitting chips 102 emit the laser light, the generated heat is different. At this time, the laser 10 may be a two-color laser or a multi-color laser, and the plurality of light-emitting chips 102 may emit laser light of two or three colors. At this time, the light-emitting chips 102 may be distinguished according to the colors of the emitted laser light.

In the embodiments, a heat size relationship generated during light emission of the plurality of light-emitting chips 102 may be determined based on the working parameters of respective light-emitting chips 102 in the laser 10, and the plurality of light-emitting chips 102 are arranged according to the heat size relationship. In some embodiments, there are the light-emitting chips 102 in the first region, first parameters of which are less than first parameters of the light-emitting chips 102 in the second region. The first parameter includes at least one of photothermal conversion efficiency, power, or a wavelength of emitted laser light. In this way, the light-emitting chips 102 with high heat generated during light emission can be disposed in the second region and the light-emitting chips 102 with low heat generated during light emission can be disposed in the first region, thereby reducing heat accumulation in the first region.

The photothermal conversion efficiency refers to the efficiency that the light-emitting chip 102 converts light energy into heat energy during light emission. The higher the photothermal conversion efficiency, the higher the heat generated by the light-emitting chip 102 during light emission. The higher the power of the light-emitting chip 102, the higher the brightness of the emitted laser light, and the higher the heat generated by the light-emitting chip 102 during light emission. The longer the wavelength of the emitted laser light, the higher the heat generated by the light-emitting chip 102 during light emission. For example, the heat generated by a red light-emitting chip during light emission, the heat generated by a green light-emitting chip during light emission, and the heat generated by a blue light-emitting chip during light emission decrease progressively.

Exemplarily, taking the first parameter only including the wavelength of the emitted laser light as an example, in the case that the laser 10 includes three types of light-emitting chips 102, the light-emitting chips 102 with the longer wavelength of the emitted laser light may be arranged in the second region first, and in the case that the second region is still vacant, the light-emitting chips 102 with the second longest wavelength of the emitted laser light are arranged in the vacant region. In the case that the second region is not enough to arrange all the light-emitting chips 102 with the second longest wavelength of the emitted laser light, the unarranged light-emitting chips 102 with the second longest wavelength of the emitted laser light are arranged in the first region, and the light-emitting chips 102 with the shorter wavelength of the emitted laser light are arranged in the first region.

In some embodiments, one row of light-emitting chips 102 may include different types of light-emitting chips 102, the light-emitting chips 102 with lower generated heat may be disposed at the positions proximal to the middle of the one row of light-emitting chips 102, and the light-emitting chips 102 with higher generated heat may be disposed at the positions proximal to both ends (head end or tail end). Alternatively, different types of light-emitting chips 102 may be disposed in one row of light-emitting chips 102 in a staggered manner.

In some embodiments, different types of light-emitting chips 102 may be provided in two rows, with at least one color of light-emitting chips 102 provided in each row. For example, a first row of light-emitting chips 102 comprises light-emitting chips emitting one color, and a second row of light-emitting chips 102 comprises light-emitting chips emitting two colors, e.g., the first row of light-emitting chips 102 emits a red laser light, and the second row of light-emitting chips 102 emits a blue laser light and a green laser light.

Exemplarily, with continued reference to FIG. 13, the first row of light-emitting chips 102 may be six red light-emitting chips, and the second row of light-emitting chips 102 may include green light-emitting chips and blue light-emitting chips, for example, four green light-emitting chips and three blue light-emitting chips. At this time, the arrangement of the second row of light-emitting chips 102 may be: the green light-emitting chips are disposed adjacently, and the blue light-emitting chips are disposed adjacently. For example, the first to fourth light-emitting chips 102 in the second row are the blue light-emitting chips, and the fifth to seventh light-emitting chips 102 in the second row are the green light-emitting chips. Alternatively, the arrangement of the second row of light-emitting chips 102 may be: the green light-emitting chips and the blue light-emitting chips are arranged in a staggered manner. For example, the second, third, fifth, and sixth light-emitting chips 102 in the second row are the blue light-emitting chips, and the first, fourth, and seventh light-emitting chips 102 in the second row are the green light-emitting chips.

In some embodiments, as shown in FIG. 14, the laser 10 further includes a collimating lens group 106. The collimating lens group 106 is disposed on one side of the light-transmitting layer 105 distal from the base plate 1011. FIG. 14 illustrates an example where the collimating lens group 106 is fixed to the surface of one side of the outer edge of the metal cover plate 104 distal from the base plate 1011. Exemplarily, the collimating lens group 106 may also be fixed to the surface of one side of the light-transmitting layer 105 distal from the base plate 1011.

The collimating lens group 106 includes a plurality of collimating lenses 1061 disposed in multi-row and multi-column, and the plurality of collimating lenses 1061 correspond to the plurality of light-emitting chips 102. Any one of the plurality of collimating lenses 1061 is configured to collimate the laser light emitted by the corresponding light-emitting chip 102. The collimating lenses 1061 corresponding to the light-emitting chips 102 in the first sub-region are disposed in a third sub-region of the collimating lens group 106, and the collimating lenses 1061 corresponding to the light-emitting chips 102 in the second sub-region are disposed in a fourth sub-region of the collimating lens group 106.

The plurality of collimating lenses 1061 satisfy at least one of: a quantity of the collimating lenses 1061 in the third sub-region is less than a quantity of the collimating lenses 1061 in the fourth sub-region; or a center-to-center distance between two adjacent collimating lenses 1061 in the same row in the third sub-region is greater than a center-to-center distance between two adjacent collimating lenses 1061 in the same row in the fourth sub-region.

The above center-to-center distance between two collimating lenses 1061 refers to the distance between center points of orthogonal projections of the two collimating lenses 1061. When the vertex of a convex arc surface of the collimating lens 1061 coincides with the center point of the corresponding orthogonal projection, the center-to-center distance between two collimating lenses 1061 refers to the distance between the vertices of the convex arc surfaces of the two collimating lenses 1061.

Exemplarily, the arrangement of the collimating lenses 1061 in the collimating lens group 106 is the same as that of the light-emitting chips 102 on the base plate 1011. In this way, it can be ensured that the laser light emitted by the plurality of light-emitting chips 102 can be collimated by the corresponding collimating lenses 1061, thus ensuring normal working of the laser 10.

Figure 15:
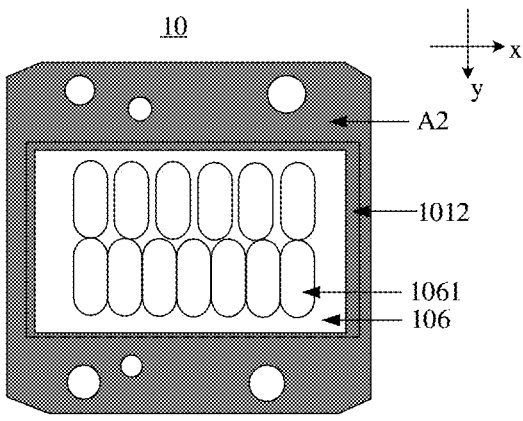
FIG. 15 is yet another top view of a laser according to some embodiments.

In some embodiments, corresponding to the arrangement of the plurality of light-emitting chips 102 in FIG. 13, as shown in FIG. 15, the quantity of the collimating lenses 1061 in the third region is less than the quantity of the collimating lenses 1061 in the fourth region; and the center-to-center distance between two adjacent collimating lenses 1061 in the same row in the third region is greater than the center-to-center distance between two adjacent collimating lenses 1061 in the same row in the fourth region.

Figure 16:
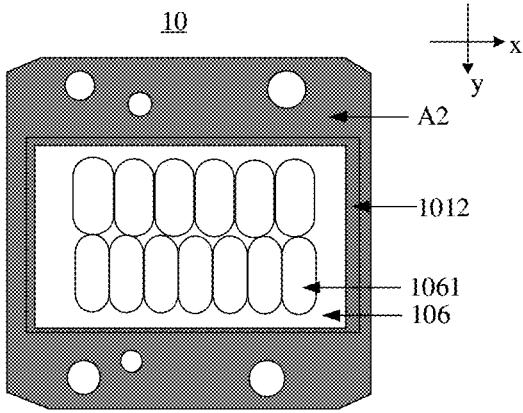
FIG. 16 is yet another top view of a laser according to some embodiments.

In some embodiments, as shown in FIG. 16, in the row direction, the width of at least one collimating lens 1061 in the third region is greater than the width of at least one collimating lens 1061 in the fourth region. In this example, one row of collimating lenses 1061 in the third region can be closely arranged in the row direction. In this way, it is conductive to reducing the difficulty of disposing the collimating lens group 106. At the same time, an orthogonal projection area of the collimating lenses 1061 in the third region can be increased, such that the collimating lenses 1061 in the third region can receive more laser light from the light-emitting chips 102 in the first sub-region, thereby improving the utilization rate of the laser light emitted by the light-emitting chips 102 in the first sub-region.

Figure 17:
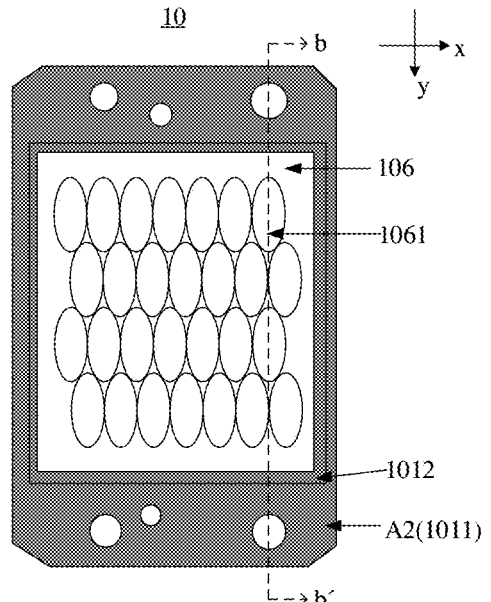
FIG. 17 is yet another top view of a laser according to some embodiments.
Figure 18:
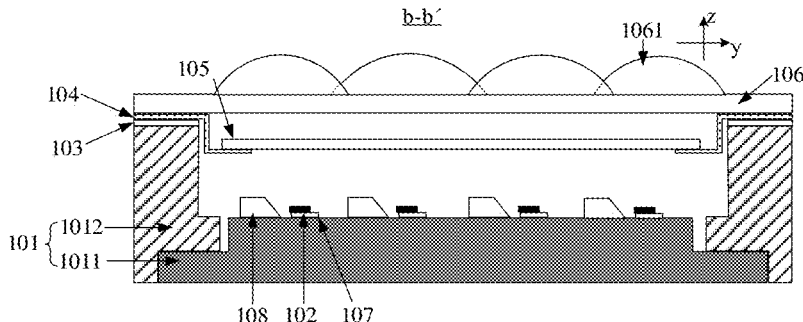
FIG. 18 is a cross-sectional view of the laser in FIG. 17 along line b-b'.

In some embodiments, as shown in FIG. 17, any one of the plurality of collimating lenses 1061 includes an end portion and a middle part in the column direction. The width of the end portion in the row direction is less than the width of the middle part in the row direction. In the plurality of collimating lenses 1061, there is a gap between the end portions of two adjacent collimating lenses 1061 in the same row. At least part of the end portion of at least one collimating lens 1061 in one row of collimating lenses 1061 of the plurality of collimating lenses 1061 is disposed in the gap of the adjacent row of collimating lenses 1061 of the one row of collimating lenses 1061. At this time, as shown in FIG. 18, the projections of the plurality of collimating lenses 1061 on a plane perpendicular to the base plate 1011 are overlapped.

In this way, in the collimating lens group 106, part of the collimating lens 1061 is at least disposed in the gap between the end portions of two adjacent collimating lenses 1061 in the same row, so that a space utilization rate in the collimating lens group 106 is improved, the area of the region where the collimating lenses 1061 are not disposed in the collimating lens group 106 is reduced, and the arrangement density of the collimating lenses 1061 is improved. Therefore, in the laser light emitted by the plurality of light-emitting chips 102, the proportion of the laser light received by the collimating lens group 106 is increased, and the utilization rate of the laser light emitted by the plurality of light-emitting chips 102 is improved, thereby improving light-emitting efficiency of the laser 10.

At the same time, as the arrangement density of the plurality of collimating lenses 1061 in the collimating lens group 106 is greater, more collimating lenses 1061 can be disposed in the laser 10 without increasing the volume of the laser 10, which is conductive to the miniaturization design of the laser 10.

In some embodiments, with continued reference to FIG. 17, in the plurality of collimating lenses 1061, the middle parts of two adjacent collimating lenses 1061 in the same row are in contact. In this way, the arrangement length of one row of collimating lenses 1061 in the row direction is smaller, which is conductive to the miniaturization design of the laser 10. At the same time, the area of the region where the collimating lenses 1061 are not disposed in one row of collimating lenses 1061 can be reduced, and the utilization ratio of the one row of collimating lenses 1061 for the laser light emitted by the corresponding light-emitting chips 102 is improved.

In some embodiments, with continued reference to FIG. 17, in the plurality of collimating lenses 1061, the end portions of two adjacent rows of collimating lenses 1061 are in contact. In this way, the gap between the end portions of two adjacent collimating lenses 1061 in the same row can be more filled by the end portion of the collimating lens 1061 in the adjacent row of the two collimating lenses 1061, the arrangement of two adjacent rows of collimating lenses 1061 is more compact and the light-emitting efficiency of the laser 10 is higher.

In some embodiments, in the plurality of collimating lenses 1061, the end portions of one row of collimating lenses 1061 and the gaps of the adjacent rows of collimating lenses 1061 of the one row of collimating lenses 1061 are consistent in shape. In this way, the end portions of the one row of collimating lenses 1061 can fill the gaps between the end portions of the adjacent rows of collimating lenses 1061 of the one row of collimating lenses 1061.

Figure 19:
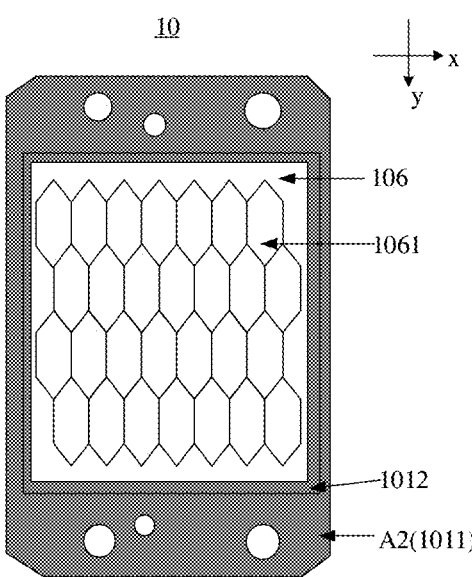
FIG. 19 is yet another top view of a laser according to some embodiments.

In some embodiments, as shown in FIG. 19, orthogonal projections of the plurality of collimating lenses 1061 in the collimating lens group 106 on the base plate 1011 are the same in shape. In this way, the arrangement of the plurality of collimating lenses 1061 is more regular, and the difficulty of disposing the plurality of collimating lenses 1061 can be reduced. At the same time, after the collimating lenses 1061 collimate the laser light emitted by the corresponding light-emitting chips 102, the acquired light spots are relatively uniform in shape, which can improve the quality of the illumination beam provided by the laser 10.

Figure 20:
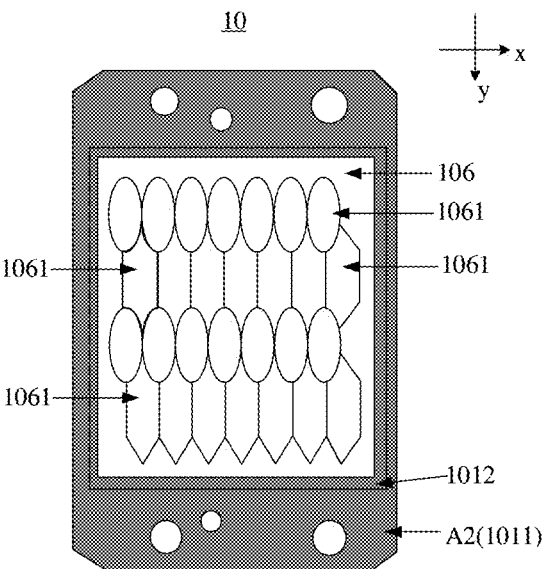
FIG. 20 is yet another top view of a laser according to some embodiments.

In some other examples, as shown in FIG. 20, the orthographic projections of the plurality of collimating lenses 1061 in the collimating lens group 106 on the base plate 1011 are not exactly the same in shape. In this way, the gaps between the end portions of the collimating lenses 1061 with regular shapes can be filled with the collimating lenses 1061 with irregular shapes, and the consistency requirement on the plurality of collimating lenses 1061 is lower. Therefore, this example can be configured to transform the collimating lens group in the related art. That is, in the plurality of collimating lenses in the related art, part of collimating lenses with regular shapes can be replaced with the collimating lenses with irregular shapes, such that the gaps between the end portions of the collimating lenses with regular shapes can be filled.

In the related art, the collimating lens realizes the collimation of the laser light by reducing the divergence angle of the laser light of the light-emitting chip 102' corresponding to the collimating lens. Moreover, a reduction amount of the divergence angle of the laser light by the collimating lens is the same in all directions. However, the divergence angle of the laser light emitted by the light-emitting chip 102' in a fast axis direction is greater than the divergence angle of the laser light in a slow axis direction. Therefore, the collimation of the collimating lens in the related art is poor.

In some embodiments, any one collimating lens 1061 in the plurality of collimating lenses 1061 is configured to collimate part of the laser light to reduce the difference value between the length of a light spot of the part of laser light on the fast axis and the length of the light spot on the slow axis. The part of laser light is the laser light emitted by the light-emitting chip 102 corresponding to the any one collimating lens 1061.

In the above embodiments, an adjustment amount of the collimating lens 1061 for the divergence angle of the laser light emitted by the light-emitting chip 102 corresponding to the collimating lens 1061 is different in different directions, such that the difference value between the length of the light spot of the laser light on the fast axis and the length of the light spot on the slow axis can be reduced, thereby improving a collimation effect of the laser light, improving the brightness of the illumination beam provided by the laser 10, and further improving a display effect of the projection image.

In some embodiments, as shown in FIG. 21, the above part of laser light is incident into the collimating lens 1061 from a first surface D1 of the corresponding collimating lens 1061, and is emitted from the collimating lens 1061 from a second surface D2 of the collimating lens 1061. The first surface D1 is configured to increase the divergence angle of the part of laser light on the slow axis; and the second surface D2 is configured to reduce the divergence angles of the part of laser light on the slow axis and the fast axis.

In this way, the difference value between the length of the light spot of the first part of laser light on the fast axis and the length of the light spot on the slow axis is reduced after the part of laser light is transmitted through the first surface D1. After transmitted through the second surface D2, the part of laser light is collimated by the second surface D2, and the light spot of the part of laser light is reduced, such that it can be ensured that the part of laser light is emitted from the laser 10 and then reaches other components in the light source assembly 1, and light loss caused by the light in the part of laser light emitted from the light source assembly 1 can be avoided, thereby improving the utilization rate of the laser light emitted by the plurality of light-emitting chips 102.

In some embodiments of this embodiment, as shown in FIG. 22, the first surface D1 includes a concave arc surface. The following embodiment illustrates an example where the fast axis of the laser light emitted by the plurality of light-emitting chips 102 is parallel to the x direction and the slow axis is parallel to the y direction. As shown in FIG. 22 and FIG. 23, a radius of curvature of the concave arc surface on the slow axis is less than a radius of curvature of the concave arc surface on the fast axis.

It should be noted that the concave arc surface of the lens has a diffusion effect on the light incident to the lens, the smaller the radius of curvature of the concave arc surface, the greater a bending degree of the concave arc surface, and the stronger the diffusion effect of the concave arc surface on the light, the greater a diffusion amount of the divergence angle of the light. Therefore, the radius of curvature of the concave arc surface of the collimating lens 1061 on the slow axis of the above part of laser light is less than the radius of curvature on the fast axis, and then after the part of laser light is transmitted through the concave arc surface of the collimating lens 1061, an expansion amount of the divergence angle of the part of laser light on the fast axis is less than an expansion amount of the divergence angle on the slow axis. In this way, after the part of laser light is transmitted through the concave arc surface of the collimating lens 1061, the difference value between the length of the light spot of the part of laser light on the fast axis and the length of the light spot on the slow axis is reduced.

With continued reference to FIG. 22, the second surface D2 includes a convex arc surface, and a radius of curvature of the convex arc surface on the slow axis is greater than or equal to a radius of curvature the convex arc surface on the fast axis.

Exemplarily, the radius of curvature of the convex arc surface on the slow axis is equal to the radius of curvature of the convex arc surface on the fast axis. At this time, the curvatures of the convex arc surface in the second surface D2 on the slow axis and the fast axis of the part of laser light are the same, and the convex arc surface may be a part in a spherical surface, for example. In this way, the convex arc surface can only collimate the whole part of laser light, such that the reduction amount of the divergence angle of the part of laser light on the fast axis is close to the reduction amount of the divergence angle on the slow axis, it is unnecessary to differently design the curvatures of the convex arc surface in different directions, and the structure of the convex arc surface is simpler.

Alternatively, with continued reference to FIG. 22 and FIG. 23, the radius of curvature of the convex arc surface on the slow axis is greater than the radius of curvature of the convex arc surface on the fast axis. At this time, the convex arc surface in the second surface D2 is a free-form surface.

It should be noted that the convex arc surface of the lens has a convergence action on the incident light, the smaller the radius of curvature of the convex arc surface, the greater the bending degree of the convex arc surface, and the stronger the convergence effect of the convex arc surface for the light, the greater the reduction amount of the divergence angle of the light. Therefore, the radius of curvature of the convex arc surface of the collimating lens 1061 on the slow axis of the above part of laser light is greater than the radius of curvature of the convex arc surface on the fast axis, and after the part of laser light is transmitted through the convex arc surface of the collimating lens 1061, the reduction amount of the divergence angle of the part of laser light on the fast axis is greater than the reduction amount of the divergence angle on the slow axis. In this way, the convex arc surface can further reduce the difference value between the length of the light spot of the part of laser light on the fast axis and the length on the slow axis other than collimating the part of laser light.

In some other examples of the embodiments, as shown in FIG. 24, the first surface D1 includes a concave cylindrical surface. A straight generatrix of the concave cylindrical surface is parallel to the fast axis.

It should be noted that the cylindrical surface is a curved surface formed by parallel movement of a moving straight line along a fixed curve, and the moving straight line is called the straight generatrix of the cylindrical surface. The above straight generatrix of the concave cylindrical surface may be, for example, the straight line L1 in FIG. 24. The straight line L1 is parallel to the x direction.

It should be noted that in the above part of laser light, the light incident to the concave cylindrical surface along the fast axis direction is equivalent to being incident to one plane, and the concave cylindrical surface does not change a propagation path of the light incident to the concave cylindrical surface along the fast axis direction. The light incident to the concave cylindrical surface along the slow axis direction is equivalent to being incident to one concave arc surface, and the concave cylindrical surface can increase the divergence angle of the light incident to the concave cylindrical surface along the slow axis direction. Therefore, the concave cylindrical surface can reduce the difference value between the length of the light spot of the part of laser light on the fast axis and the length on the slow axis.

In some other embodiments, as shown in FIG. 25, the first surface D1 is a plane. In the embodiments, the first surface D1 does not change the propagation path of the above part of laser light. In this way, one surface of the collimating lens group 106 proximal to the base plate 1011 is flatter, and the collimating lens group 106 can be more stably disposed on the metal ring structure 103 or the light-transmitting layer 105, thereby improving the reliability of the laser 10.

In some embodiments, the second surface D2 includes the convex arc surface. Referring to FIG. 25 and FIG. 26, the radius of curvature of the convex arc surface on the slow axis is greater than the radius of curvature of the convex arc surface on the fast axis.

Similar to the principle in the above embodiments, in this example, after the above part of laser light is transmitted through the convex arc surface of the second surface D2, the convex arc surface can collimate the part of laser light and reduce the difference value between the length of the light spot of the part of laser light on the fast axis and the length on the slow axis.

In some embodiments, the plurality of light-emitting chips 102 include a first type of light-emitting chips and a second type of light-emitting chips. The first type of light-emitting chips is configured to emit a first type of laser light in the laser light, and the second type of light-emitting chips is configured to emit a second type of laser light in the laser light, and a divergence angle of the first type of laser light is less than a divergence angle of the second type of laser light. The above part of laser light is the first type of laser light or the second type of laser light.

The reduction amount of the second surfaces D2 of the collimating lenses 1061 corresponding to the first type of light-emitting chips for the divergence angle of the first type of laser light is less than the reduction amount of the second surfaces D2 of the collimating lenses 1061 corresponding to the second type of light-emitting chips for the divergence angle of the second type of laser light.

Exemplarily, the first type of laser light may include green laser light and blue laser light, and the second type of laser light may include red laser light. The above reduction amount of the second surface D2 for the divergence angle of the first type of laser light or the second type of laser light may be adjusted by adjusting the radius of curvature of the convex arc surface of the second surface D2. Relevant principles may refer to the above embodiments, and will not be described in detail here.

In the above embodiments, the second surfaces D2 of the collimating lenses 1061 corresponding to different types of light-emitting chips 102 have different reduction amounts for the divergence angle of light, such that the light-emitting chips 102 of different types can have light spots of the same size after being collimated by the collimating lens group 106. In this way, the uniformity and quality of the illumination beam provided by the laser 10 can be improved, thereby improving the display effect of the projection image.

In some embodiments, with continued reference to FIG. 11 and FIG. 12, the laser 10 further includes a plurality of heat sinks 107. The plurality of heat sinks 107 correspond to the plurality of light-emitting chips 102. One heat sink 107 is disposed between the corresponding light-emitting chip 102 and the base plate 1011, and is configured to assist the light-emitting chip 102 in heat dissipation, such that the heat generated by the light-emitting chip 102 is conducted to the base plate 1011 more quickly. In some embodiments, the plurality of light-emitting chips 102 may share one heat sink 107, which is not limited by the present disclosure.

In some embodiments, with continued reference to FIG. 11 and FIG. 12, the laser 10 further includes a plurality of reflecting prisms 108. The plurality of reflecting prisms 108 correspond to the plurality of light-emitting chips 102. One heat sink 107 is disposed on the light-output side of the corresponding light-emitting chip 102, and is configured to guide the laser light emitted by the light-emitting chip 102 towards a direction distal from the base plate 1011, such that the laser light is emitted from the accommodating space S.

In summary, the laser projection apparatus 1000 according to the embodiments of the present disclosure can avoid putting the plurality of light-emitting chips 102 into a heating furnace for heating during the manufacturing process of the laser 10, and prevent the high temperature during brazing from damaging the plurality of light-emitting chips 102, thereby improving the reliability of the laser 10. Moreover, by adjusting the arrangement of the plurality of light-emitting chips 102 and the corresponding plurality of collimating lenses 1061 in different regions, the heat dissipation speed of the light-emitting chips 102 during operation can be accelerated, and thermal damage to the light-emitting chips 102 during operation is prevented. In addition, by adjusting the arrangement of the plurality of collimating lenses 1061 in the collimating lens group 106, the area of the region in the collimating lens group 106 where the collimating lenses 1061 are not disposed is reduced, the utilization rate of the laser light emitted by the plurality of light-emitting chips 102 is improved, and the brightness of the illumination beam is improved. In addition, by designing the shapes and curvatures of the first surfaces D1 and the second surfaces D2 of the collimating lenses 1061, the collimation effect of the laser light emitted by the plurality of light-emitting devices 102 is improved, thereby improving the display effect of the projection image.

The foregoing is only specific implementations of the present disclosure, and the protection scope of the present disclosure is not limited thereto. The changes or substitutions conceivable by any person of skill familiar with the art within the technical scope disclosed in the present disclosure should be included in the protection scope of the present disclosure. Therefore, the scope of protection of the present disclosure should be based on the scope of protection of the claims.

What is claimed is:

1. A laser projection apparatus comprising:
a light source assembly, configured to provide an illumination beam;
a light-modulating assembly, configured to modulate the illumination beam with an image signal to acquire a projection beam; and
a projection lens, configured to project the projection beam into an image;
wherein the light source assembly comprises:
a base plate;
a frame, disposed on the base plate, an accommodating space being defined between the base plate and the frame, and a material of the frame is ceramic;
a plurality of light-emitting chips, disposed in the accommodating space and configured to emit laser light, the laser light being emitted from the accommodating space in a direction distal from the base plate;
a metal ring structure, configured to be fixed to the frame;
a metal cover plate, wherein an outer edge of the metal cover plate is fixed to one side of the metal ring structure distal from the base plate; and
a light-transmitting layer, wherein an edge of the light-transmitting layer is fixed to an inner edge of the metal cover plate.

2. The laser projection apparatus according to claim 1, wherein an outer edge of the frame proximal to an end portion of the base plate protrudes relative to an inner edge of the end portion to form a first protrusion portion;
wherein the first protrusion portion surrounds the base plate, and the inner edge of the end portion is fixed to one side of the base plate towards the accommodating space; and a side surface of the first protrusion portion towards the base plate is fixed to a side surface of the base plate.

3. The laser projection apparatus according to claim 1, wherein the plurality of light-emitting chips are disposed on the base plate; an inner wall of the frame protrudes towards the accommodating space to form a second protrusion portion; and
the light source assembly further comprises:
a plurality of conductive layers, disposed on one side of the second protrusion portion distal from the base plate and configured to be coupled with the plurality of light-emitting chips;
wherein a distance between a surface of one side of the second protrusion portion, distal from the base plate, and a surface of one side of the base plate on which the plurality of light-emitting chips are disposed, is less than a height threshold.

4. The laser projection apparatus according to claim 3, wherein the base plate comprises:

a first region; and a second region surrounding the first region, wherein the first region protrudes relative to the second region, the frame is fixed in the second region, and the plurality of light-emitting chips are disposed in the first region.

5. The laser projection apparatus according to claim 1, wherein the metal ring structure is fixed to one side of the frame distal from the base plate; and a material of the metal ring structure comprises an iron-nickel alloy.

6. The laser projection apparatus according to claim 1, wherein the base plate comprises a first region, wherein the plurality of light-emitting chips are disposed in the first region, and the first region comprises a first sub-region and a second sub-region and satisfies at least one of:

a quantity of the light-emitting chips in the first sub-region is less than a quantity of the light-emitting chips in the second sub-region; or, an arrangement density of the light-emitting chips in the first sub-region is less than an arrangement density of the light-emitting chips in the second sub-region.

7. The laser projection apparatus according to claim 6, wherein the quantity of the light-emitting chips in the first sub-region is less than the quantity of the light-emitting chips in the second sub-region, and the arrangement density of the light-emitting chips in the first sub-region is less than the arrangement density of the light-emitting chips in the second sub-region.

8. The laser projection apparatus according to claim 6, wherein the plurality of light-emitting chips comprise a plurality of rows of light-emitting chips;

wherein at least one row of light-emitting chips is present in the plurality of rows of light-emitting chips, with adjacent rows of light-emitting chips to the at least one row of light-emitting chips being staggered.

9. The laser projection apparatus according to claim 8, the at least one row of light-emitting chips comprises a first row of light-emitting chips and a second row of light-emitting chips, wherein the first row of light-emitting chips emits laser light at a wavelength of a first wavelength, and the second row of light-emitting chips emits laser light at a wavelength of a second wavelength and a third wavelength, the first wavelength being greater than the second wavelength and the second wavelength being greater than the third wavelength.

10. The laser projection apparatus according to claim 6, wherein there are the light-emitting chips in the first sub-region, a first parameter of which is less than a first parameter of the light-emitting chips in the second sub-region; wherein the first parameter comprises at least one of photothermal conversion efficiency, power, or a wavelength of emitted laser light.

11. The laser projection apparatus according to claim 6, wherein the light source assembly further comprises:

a collimating lens group disposed on one side of the light-transmitting layer distal from the base plate;

wherein the collimating lens group comprises a plurality of collimating lenses disposed in multi-row and multi-column, wherein the plurality of collimating lenses correspond to the plurality of light-emitting chips, and any one of the plurality of collimating lenses is configured to collimate laser light emitted by a corresponding light-emitting chip; and collimating lenses corresponding to light-emitting chips in the first sub-region are disposed in a third sub-region of the collimating lens group, and collimating lenses corresponding to light-emitting chips in the second sub-region are disposed in a fourth sub-region of the collimating lens group; and the plurality of collimating lenses satisfy at least one of:

a quantity of the collimating lenses in the third sub-region is less than a quantity of the collimating lenses in the fourth sub-region; or, a center-to-center distance between two adjacent collimating lenses in a same row in the third sub-region is greater than a center-to-center distance between two adjacent collimating lenses in a same row in the fourth sub-region.

12. The laser projection apparatus according to claim 11, wherein the quantity of the collimating lenses in the third sub-region is less than the quantity of the collimating lenses in the fourth sub-region; and the center-to-center distance between two adjacent collimating lenses in the same row in the third sub-region is greater than the center-to-center distance between two adjacent collimating lenses in the same row in the fourth sub-region.

13. The laser projection apparatus according to claim 1, wherein the light source assembly further comprises:

the collimating lens group disposed on one side of the light-transmitting layer distal from the base plate;

wherein the collimating lens group comprises a plurality of collimating lenses disposed in multi-row and multi-column, wherein the plurality of collimating lenses correspond to the plurality of light-emitting chips, and any one of the plurality of collimating lenses is configured to collimate laser light emitted by a corresponding light-emitting chip;

each of the collimating lenses comprises an end portion and a middle portion in a column direction, wherein a width of the end portion in a row direction is less than a width of the middle portion in the row direction; and in the plurality of collimating lenses, there is a gap between the end portions of two adjacent collimating lenses in a same row; and at least part of the end portion of at least one collimating lens in one row of the plurality of collimating lenses is disposed in a gap of adjacent rows of collimating lenses of the one row of collimating lenses.

14. The laser projection apparatus according to claim 12, wherein the laser projection apparatus satisfies at least one of:

in the plurality of collimating lenses, the middle portions of two adjacent collimating lenses in the same row are in contact; or in the plurality of collimating lenses, the end portions of two adjacent rows of collimating lenses are in contact.

15. The laser projection apparatus according to claim 12, wherein in the plurality of collimating lenses, the end portions of one row of collimating lenses and the gap of the adjacent row of collimating lenses of the one row of collimating lenses are consistent in shape.

16. The laser projection apparatus according to claim 1, wherein the light source assembly further comprises:

a collimating lens group disposed on one side of the light-transmitting layer distal from the base plate;

wherein the collimating lens group comprises a plurality of collimating lenses disposed in multi-row and multi-column, wherein the plurality of collimating lenses corresponds to the plurality of light-emitting chips; and any one of the plurality of collimating lenses is configured to collimate part of the laser light to reduce a difference value between a length of a light spot of the part of laser light on a fast axis and a length of the light spot on a slow axis; wherein the part of laser light is laser light emitted by a light-emitting chip corresponding to the one collimating lens.

17. The laser projection apparatus according to claim 16, wherein the part of laser light is incident to the collimating lens from a first surface of a corresponding collimating lens and is emitted from the collimating lens from a second surface of the collimating lens;

wherein the first surface is configured to increase a divergence angle of the part of laser light on the slow axis; and the second surface is configured to reduce divergence angles of the part of laser light on the slow axis and the fast axis.

18. The laser projection apparatus according to claim 17, wherein the first surface comprises a concave arc surface, a radius of curvature of the concave arc surface on the slow axis being less than a radius of curvature of the concave arc surface on the fast axis; or, the first surface comprises a concave cylindrical surface, a straight generatrix of the concave cylindrical surface being parallel to the fast axis; and the second surface comprises a convex arc surface, a radius of curvature of the convex arc surface on the slow axis being greater than or equal to a radius of curvature of the convex arc surface on the fast axis.

19. The laser projection apparatus according to claim 16, wherein the part of laser light is incident to the collimating lens from a first surface of a corresponding collimating lens and is emitted from the collimating lens from a second surface of the collimating lens;

wherein the first surface is a plane; and the second surface comprises a convex arc surface, a radius of curvature of the convex arc surface on the slow axis being greater than a radius of curvature of the convex arc surface on the fast axis.

20. The laser projection apparatus according to claim 17, wherein the plurality of light-emitting chips comprise a first type of light-emitting chips and a second type of light-emitting chips;

wherein the first type of light-emitting chips is configured to emit a first type of laser light in the laser light, the second type of light-emitting chips is configured to emit a second type of laser light in the laser light, a divergence angle of the first type of laser light being less than a divergence angle of the second type of laser light, and the part of laser is the first type of laser light or the second type of laser light; and a reduction amount of second surfaces of collimating lenses corresponding to the first type of light-emitting chips for the divergence angle of the first type of laser light is less than a reduction amount of second surfaces of collimating lenses corresponding to the second type of light-emitting chips for the divergence angle of the second type of laser light.

\* \* \* \* \*